(12) United States Patent
Grzeskowiak, II et al.

(10) Patent No.: US 11,498,298 B2
(45) Date of Patent: Nov. 15, 2022

(54) SYNTHETIC MOLDED SLABS, AND SYSTEMS AND METHODS RELATED THERETO

(71) Applicant: Cambria Company LLC, Eden Prairie, MN (US)

(72) Inventors: Jon Louis Grzeskowiak, II, Prior Lake, MN (US); Martin E. Davis, Excelsior, MN (US)

(73) Assignee: Cambria Company LLC, Eden Prairie, MN (US)

( * ) Notice: Subject to any disclaimer, the term of this patent is extended or adjusted under 35 U.S.C. 154(b) by 0 days.

(21) Appl. No.: 17/233,878

(22) Filed: Apr. 19, 2021

(65) Prior Publication Data

US 2021/0308975 A1    Oct. 7, 2021

Related U.S. Application Data

(60) Continuation of application No. 16/360,665, filed on Mar. 21, 2019, now Pat. No. 10,981,346, which is a continuation of application No. 16/005,545, filed on Jun. 11, 2018, now Pat. No. 10,300,626, which is a continuation of application No. 14/880,608, filed on Oct. 12, 2015, now Pat. No. 9,993,943, which is a division of application No. 14/879,477, filed on Oct. 9, 2015, now Pat. No. 9,993,942, which is a division of application No. 14/878,393, filed on Oct. 8, 2015, now Pat. No. 9,718,303, which is a continuation of
(Continued)

(51) Int. Cl.
| | | |
|---|---|---|
| *B32B 3/10* | (2006.01) | |
| *B29D 99/00* | (2010.01) | |
| *B29C 31/10* | (2006.01) | |
| *B44F 9/04* | (2006.01) | |
| *B32B 5/16* | (2006.01) | |
| *B32B 5/14* | (2006.01) | |

(52) U.S. Cl.
CPC ............ *B29D 99/001* (2013.01); *B29C 31/10* (2013.01); *B44F 9/04* (2013.01); *B29D 99/0039* (2013.01); *B32B 5/14* (2013.01); *B32B 5/16* (2013.01); *B32B 2419/04* (2013.01); *B32B 2607/00* (2013.01); *Y10T 428/24802* (2015.01)

(58) Field of Classification Search
None
See application file for complete search history.

(56) References Cited

U.S. PATENT DOCUMENTS

| | | |
|---|---|---|
| 178,308 A | 6/1876 | Leathers et al. |
| 1,212,331 A | 1/1917 | Denivelle |
| 1,474,817 A | 11/1923 | Fincke |

(Continued)

FOREIGN PATENT DOCUMENTS

| | | |
|---|---|---|
| CA | 2896383 | 7/2017 |
| CH | 190667 | 7/1937 |

(Continued)

OTHER PUBLICATIONS

"Cambria introduces the new costal collection," [press release] Feb. 4, 2014, 2 pages.

(Continued)

*Primary Examiner* — Christopher M Polley
(74) *Attorney, Agent, or Firm* — Fish & Richardson P.C.

(57) ABSTRACT

This document describes systems and processes for forming improved synthetic molded slabs suitable for use in living or working spaces (e.g., along a countertop, table, floor, or the like).

20 Claims, 11 Drawing Sheets

Related U.S. Application Data application No. 14/463,494, filed on Aug. 19, 2014, now Pat. No. 9,186,819.

(56) References Cited

U.S. PATENT DOCUMENTS

| | | | |
|---|---|---|---|
| 1,485,810 A | 3/1924 | Parker, Jr. et al. |
| 1,568,070 A | 1/1926 | Jennens |
| 1,570,538 A | 1/1926 | Thomas |
| 1,711,701 A | 5/1929 | Speck |
| 1,939,045 A | 12/1933 | Fredriksen |
| D92,186 S | 5/1934 | Little |
| 2,280,488 A | 4/1942 | Jenkins et al. |
| 2,474,654 A | 6/1949 | Carlson |
| 2,556,486 A | 6/1951 | Smith |
| 2,716,070 A | 8/1955 | Seipt |
| 2,930,097 A | 3/1960 | Iversen |
| 3,013,370 A | 12/1961 | Vida |
| 3,088,713 A | 5/1963 | Gard |
| 3,164,647 A | 1/1965 | Fischler |
| 3,177,279 A | 4/1965 | Bilodeau |
| 3,200,177 A | 8/1965 | Dodd |
| 3,245,129 A | 4/1966 | Entz |
| 3,245,648 A | 4/1966 | Johansson et al. |
| 3,255,024 A | 6/1966 | Alexander et al. |
| 3,318,984 A | 5/1967 | Dussel |
| 3,578,276 A | 5/1971 | Soderlund |
| 3,628,766 A | 12/1971 | Hartmann |
| 3,670,060 A | 6/1972 | Cuffaro et al. |
| 3,712,825 A | 1/1973 | Yocum |
| 3,743,235 A | 7/1973 | Shelley |
| 3,819,436 A | 6/1974 | Allen |
| 3,843,089 A | 10/1974 | Scholz et al. |
| 3,870,777 A | 3/1975 | Jakel |
| 3,901,641 A | 8/1975 | Onder |
| 3,904,791 A | 9/1975 | Iverson et al. |
| 3,990,212 A | 11/1976 | Flodin |
| 4,094,941 A | 6/1978 | Manners et al. |
| 4,204,820 A | 5/1980 | Toncelli |
| 4,254,077 A | 3/1981 | Fontana et al. |
| 4,376,750 A | 3/1983 | Briem et al. |
| 4,388,975 A | 6/1983 | Hirano |
| 4,421,466 A | 12/1983 | Heitzman |
| 4,466,500 A | 8/1984 | Mosher et al. |
| 4,484,645 A | 11/1984 | Inoue |
| 4,680,155 A | 7/1987 | Rochefort et al. |
| 4,698,010 A | 10/1987 | Toncelli |
| 4,914,870 A | 4/1990 | Toncelli |
| 5,022,193 A | 6/1991 | Toncelli |
| 5,066,449 A | 11/1991 | Kato et al. |
| 5,080,085 A | 1/1992 | Lovato |
| 5,266,253 A | 11/1993 | Dijkhuizen et al. |
| 5,422,391 A | 6/1995 | Inoue |
| 5,445,772 A | 8/1995 | Uchida |
| 5,565,077 A | 10/1996 | Gold et al. |
| 5,662,847 A | 9/1997 | Uchida et al. |
| 5,664,305 A | 9/1997 | Lawton et al. |
| 5,670,007 A | 9/1997 | Toncelli |
| 5,679,298 A | 10/1997 | Uchida et al. |
| 5,795,513 A | 8/1998 | Austin |
| 5,813,183 A | 9/1998 | Attley |
| 5,885,503 A | 3/1999 | Bordener |
| 5,895,304 A | 4/1999 | Dixon |
| 5,976,642 A | 11/1999 | Yang |
| 6,080,234 A | 6/2000 | Bernard et al. |
| D428,590 S | 7/2000 | Lagaay |
| 6,103,160 A | 8/2000 | Uchida |
| 6,205,727 B1 | 3/2001 | Toncelli |
| 6,237,294 B1 | 5/2001 | Rygiel |
| 6,461,552 B1 | 10/2002 | Geiger |
| 6,517,915 B1 | 2/2003 | Banus |
| 6,572,802 B1 | 6/2003 | Austin |
| D491,372 S | 6/2004 | Dugas et al. |
| 6,773,641 B1 | 8/2004 | Toncelli |
| 7,140,869 B2 | 11/2006 | Toncelli |
| D602,258 S | 10/2009 | Simione et al. |
| 7,771,680 B2 | 8/2010 | Gordienko |
| D623,319 S | 9/2010 | Martin |
| 7,815,827 B2 | 10/2010 | Cruz |
| 7,901,501 B2 | 3/2011 | Kobayashi |
| 7,984,600 B2 | 7/2011 | Alford et al. |
| 8,030,441 B2 | 10/2011 | Toncelli |
| 8,101,113 B2 | 1/2012 | Castonguay et al. |
| 8,158,548 B2 | 4/2012 | Di Noto et al. |
| 8,333,916 B2 | 12/2012 | Jamrussamee et al. |
| D677,955 S | 3/2013 | Bender et al. |
| D678,556 S | 3/2013 | Metcalf |
| 8,398,954 B2 | 3/2013 | Gordienko |
| D682,557 S | 5/2013 | Lee |
| 8,436,075 B2 | 5/2013 | Buskila et al. |
| 8,632,718 B2 | 1/2014 | Ott |
| 8,636,941 B1 | 1/2014 | Ciuperca |
| 8,702,886 B2 | 4/2014 | Yaniv et al. |
| D705,954 S | 5/2014 | Choi et al. |
| D705,955 S | 5/2014 | Choi et al. |
| D712,670 S | 9/2014 | Grzeskowiak et al. |
| D714,559 S | 10/2014 | Mccuaig |
| D715,563 S | 10/2014 | Zeamer |
| 8,940,223 B2 | 1/2015 | Toncelli |
| D731,086 S | 6/2015 | Martin et al. |
| 9,073,239 B2 | 7/2015 | Banns |
| 9,085,090 B2 | 7/2015 | Toncelli |
| D737,577 S | 9/2015 | Davis et al. |
| 9,186,819 B1 | 11/2015 | Grzeskowiak, II et al. |
| D746,064 S | 12/2015 | Zeamer |
| D746,066 S | 12/2015 | Mccuaig |
| D750,905 S | 3/2016 | Davis et al. |
| 9,289,923 B1 | 3/2016 | Grzeskowiak, II et al. |
| 9,427,896 B1 | 8/2016 | Xie |
| 9,469,990 B2 | 10/2016 | Dirkson |
| 9,511,516 B2 | 12/2016 | Xie |
| D776,299 S | 1/2017 | Clevenger |
| D780,332 S | 2/2017 | Davis et al. |
| D780,333 S | 2/2017 | Davis et al. |
| 9,671,274 B1 | 6/2017 | Xie |
| 9,707,698 B1 | 7/2017 | Xie |
| 9,718,303 B2 | 8/2017 | Grzeskowiak et al. |
| 9,993,942 B2 | 6/2018 | Grzeskowiak, II et al. |
| 10,300,626 B2 | 5/2019 | Grzeskowiak et al. |
| 2002/0081388 A1 | 6/2002 | Batliner et al. |
| 2004/0032044 A1 | 2/2004 | Toncelli |
| 2004/0175514 A1 | 9/2004 | Stiattest |
| 2005/0013991 A1 | 1/2005 | Yang |
| 2005/0055931 A1 | 3/2005 | Rochette |
| 2006/0101752 A1 | 5/2006 | Sakai et al. |
| 2006/0193693 A1 | 8/2006 | Congdon |
| 2007/0057408 A1 | 3/2007 | Sandqvist et al. |
| 2007/0216058 A1 | 9/2007 | Carreras-Maldonado et al. |
| 2007/0248836 A1 | 10/2007 | Linde |
| 2008/0113123 A1 | 5/2008 | Izzo |
| 2008/0138595 A1 | 6/2008 | Bordener |
| 2008/0153688 A1 | 6/2008 | Borens et al. |
| 2008/0296795 A1 | 12/2008 | Willis-Papi |
| 2008/0315448 A1 | 12/2008 | Cruz |
| 2009/0047503 A1 | 2/2009 | Godi et al. |
| 2009/0099292 A1 | 4/2009 | Novak et al. |
| 2009/0105391 A1 | 4/2009 | Buskila et al. |
| 2010/0048772 A1 | 2/2010 | Moore |
| 2010/0159220 A1 | 6/2010 | Toncelli |
| 2010/0194005 A1 | 8/2010 | Toncelli |
| 2011/0034586 A1 | 2/2011 | Buskila et al. |
| 2011/0166696 A1 | 7/2011 | Nigon |
| 2011/0283859 A1 | 11/2011 | Codemo |
| 2012/0003453 A1 | 1/2012 | Buskila et al. |
| 2012/0153526 A1 | 6/2012 | Ko et al. |
| 2012/0183735 A1 | 7/2012 | Moreno et al. |
| 2012/0283384 A1 | 11/2012 | Cox |
| 2013/0130009 A1 | 5/2013 | van Heiden |
| 2013/0130036 A1 | 5/2013 | Bettiol et al. |
| 2013/0137810 A1 | 5/2013 | Shin |
| 2013/0196251 A1 | 8/2013 | Di Noto et al. |
| 2013/0341254 A1 | 12/2013 | Bauer |
| 2014/0141961 A1 | 5/2014 | Koszo |
| 2015/0064315 A1 | 3/2015 | Van Blokland |
| 2015/0136311 A1 | 5/2015 | Mjelde |

(56) References Cited

U.S. PATENT DOCUMENTS

| | | | |
|---|---|---|---|
| 2015/0314475 A1 | 11/2015 | Banns | |
| 2015/0360507 A1 | 12/2015 | Benito | |
| 2017/0210041 A1 | 7/2017 | Toncelli | |

FOREIGN PATENT DOCUMENTS

| | | |
|---|---|---|
| CN | 1153751 | 7/1997 |
| CN | 1184039 | 6/1998 |
| CN | 1718403 | 1/2006 |
| CN | 1301199 | 2/2007 |
| CN | 1931545 | 3/2007 |
| CN | 1966229 | 5/2007 |
| CN | 100463788 | 2/2009 |
| CN | 101486217 | 7/2009 |
| CN | 101564868 | 10/2009 |
| CN | 101864830 | 10/2010 |
| CN | 102049809 | 5/2011 |
| CN | 102050598 | 5/2011 |
| CN | 202208056 | 5/2012 |
| CN | 102528919 | 7/2012 |
| CN | 102581927 | 7/2012 |
| CN | 302025837 | 8/2012 |
| CN | 102806599 | 12/2012 |
| CN | 102950650 | 3/2013 |
| CN | 102950955 | 3/2013 |
| CN | 103481358 | 1/2014 |
| DE | 4320860 | 1/1994 |
| DE | 19506636 A1 | 9/1996 |
| DE | 19640281 | 4/1997 |
| DE | 102010053520 | 2/2012 |
| EM | 000359971-0001 | 1/2005 |
| EM | 00359971-0002 | 1/2005 |
| EM | 00359971-0003 | 1/2005 |
| EM | 000359971-0005 | 1/2005 |
| EM | 001418057-0006 | 3/2014 |
| EM | 001417646-0001 | 10/2014 |
| EM | 001417646-0010 | 10/2014 |
| EM | 001417646-0015 | 10/2014 |
| EM | 001417737-0021 | 10/2014 |
| EP | 0511545 | 11/1992 |
| EP | 0558247 | 9/1993 |
| EP | 0734625 | 10/1996 |
| EP | 0970790 | 1/2000 |
| EP | 1005967 | 6/2000 |
| EP | 0940235 | 7/2003 |
| EP | 1717000 | 11/2006 |
| EP | 1787779 | 5/2007 |
| EP | 1930142 | 6/2008 |
| EP | 2460631 | 6/2012 |
| EP | 1905749 | 7/2012 |
| EP | 2065150 | 3/2014 |
| EP | 2944443 | 11/2015 |
| EP | 3095768 | 11/2016 |
| ES | 2087313 | 7/1996 |
| ES | 2187313 | 6/2003 |
| ES | 2285150 | 11/2007 |
| GB | 2052471 | 1/1981 |
| GB | 2233640 | 1/1991 |
| JP | H071418 | 1/1995 |
| JP | H08300328 A | 11/1996 |
| JP | H08333125 A | 12/1996 |
| JP | 2004270406 | 9/2004 |
| JP | 2005-125380 | 5/2005 |
| JP | D1454121 | 10/2012 |
| JP | 2014069350 | 4/2014 |
| KR | 10-2009-0108786 | 10/2009 |
| KR | 10-2014-0080212 | 6/2014 |
| KR | 300777994.000 | 12/2014 |
| KR | 1020150088686 | 8/2015 |
| RU | 2038903 | 7/1995 |
| WO | WO 198911457 | 11/1989 |
| WO | WO D037756-004 | 12/1996 |
| WO | WO D037756-007 | 12/1996 |
| WO | WO D037756-009 | 12/1996 |
| WO | WO 200043192 | 7/2000 |
| WO | WO 2001045921 | 1/2001 |
| WO | WO 2002007939 | 1/2002 |
| WO | WO 2003027042 | 4/2003 |
| WO | WO 2004004882 | 1/2004 |
| WO | WO 2005068146 | 7/2005 |
| WO | WO 2005097447 | 10/2005 |
| WO | WO 2006100321 | 9/2006 |
| WO | WO 2006134179 | 12/2006 |
| WO | WO 2007080059 | 7/2007 |
| WO | WO 2008000168 | 1/2008 |
| WO | WO 2008015596 | 2/2008 |
| WO | WO 2009010406 | 1/2009 |
| WO | WO 2010097727 | 9/2010 |
| WO | WO 2013/166275 | 11/2013 |
| WO | WO 2014108582 | 7/2014 |
| WO | WO 2016028780 | 2/2016 |

OTHER PUBLICATIONS

[No Author Listed], "Vadara Quartz Kitchen" available on or before Jan. 1, 2018, retrieved on Sep. 7, 2021, retrieved from URL <https://www.houzz.com/hznb/photos/vadara-quartz-kitchen-transitional-orange-county-phvw-vp~98923368>, 4 pages.

Allen + Roth, Santa Cecilia Granite Brown Kitchen Countertop Item #1068221Model #NG2002, published on or before Sep. 15, retrieved on Sep. 7, 2021, retrieved from URL <https://www.lowes.com/pd/allen-roth-Santa-Cecilia-Granite-Kitchen-Countertop-Sample/1000507485>, 2018, 6 pages.

Breton Bretonstone Slabs, "Natural Stone Surfaces by Breton Technology", Breton, Cosentino Exhibit No. 1010 in Cases IPR2021-00214, IPR2021-00215, IPR2021-00216, and PGR2021-00010, 60 pages, filing date Nov. 24, 2020.

*Cambria Company LLC* vs *Consentino S.A., C & C North America Inc.*, Case No. IPR 2021-00214, U.S. Pat. No. 10,252,440, Petition for Inter Partes Review of U.S. Pat. No. 10,252,440, 88 pages, filing date Nov. 24, 2020.

*Cambria Company LLC* vs *Consentino S.A., C & C North America Inc.*, Case No. IPR 2021-00216, U.S. Pat. No. 10,195,762, Petition for Inter Partes Review of U.S. Pat. No. 10,195,762, 104 pages, filing date Nov. 24, 2020.

*Cambria Company LLC* vs *Consentino S.A., C & C North America Inc.*, Civil Action 6:20-CV-00894-ADA, Declaration of Kevin P. Tmmble, Ph.D., in Support of Plaintiffs Motion for Preliminary Injunction Cosentino Exhibit No. 1014 in Cases IPR2021-00214, IPR2021-00216, and PGR2021-00010, 62 pages, filing date Nov. 24, 2020.

Carla Aston Design, Carla Aston Design and Portfolio, published on or before Oct. 27, 2012, retrieved from URL <https://carlaaston.com/designed/vein-cut-stone-texture-with-zen-ambience> 5 pages.

CN Office Action in Chinese Appln. No. 20168008082.1, dated Jun. 17, 2019, 9 pages (with English translation).

Cole et al., "In pursuit of the cutting edge", Chicago Tribune, Dec. 7, 2010, Exhibit H, Cosentino Exhibit No. 1019 in Cases IPR2021-00214, IPR2021-00215, IPR2021-00216, and PGR2021-00010, 6 pages, filing date Nov. 24, 2020.

*Cosentino S.A.U and C & C North America Inc.*, Petitioners v. *Cambria Company LLC*, Patent Owner, US Patent and Trademark Office, Case No. IPR 2021-00214, U.S. Pat. No. 10,252,440, Declaration of Dr. John R. Dorgan in Support of Petition for Inter Partes Review of U.S. Pat. No. 10,252,440, Cosentino Exhibit No. 1004, 104 pages, filing date Nov. 24, 2020.

*Cosentino S.A.U and C & C North America Inc.*, Petitioners v. *Cambria Company LLC*, Patent Owner, US Patent and Trademark Office, Case No. IPR 2021-00214, U.S. Pat. No. 10,252,440, Notice of Filing Date Accorded to Petition and Time for Filing Patent Owner Preliminary Response, 6 pages, Dec. 9, 2020.

*Cosentino S.A.U and C & C North America Inc.*, Petitioners v. *Cambria Company LLC*, Patent Owner, US Patent and Trademark Office, Case No. IPR 2021-00214, U.S. Pat. No. 10,252,440, Patent Owners Mandatory Notices Pursuant to 37 C.F.R. 42.8, 5 pages, filing date Dec. 15, 2020.

*Cosentino S.A.U and C & C North America Inc.*, Petitioners v. *Cambria Company LLC*, Patent Owner, US Patent and Trademark

(56) References Cited

OTHER PUBLICATIONS

Office, Case No. IPR 2021-00215, U.S. Pat. No. 9,289,923, Declaration of Dr. John R. Dorgan in Support of Petition for Inter Partes Review of U.S. Pat. No. 9,289,923, Cosentino Exhibit No. 1004, 134 pages, filing date Nov. 24, 2020.
*Cosentino S.A.U and C & C North America Inc.*, Petitioners v. *Cambria Company LLC*, Patent Owner, US Patent and Trademark Office, Case No. IPR 2021-00215, U.S. Pat. No. 9,289,923, Notice of Filing Date Accorded to Petition and Time for Filing Patent Owner Preliminary Response, 5 pages, Dec. 15, 2020.
*Cosentino S.A.U and C & C North America Inc.*, Petitioners v. *Cambria Company LLC*, Patent Owner, US Patent and Trademark Office, Case No. IPR 2021-00215, U.S. Pat. No. 9,289,923, Patent Owners Mandatory Notices Pursuant to 37 C.F.R. 42.8, 5 pages, filing date Dec. 15, 2020.
*Cosentino S.A.U and C & C North America Inc.*, Petitioners v. *Cambria Company LLC*, Patent Owner, US Patent and Trademark Office, Case No. IPR 2021-00215, U.S. Pat. No. 9,289,923, Petition for Inter Partes Review of U.S. Pat. No. 9,289,923, 88 pages, filing date Nov. 24, 2020.
*Cosentino S.A.U and C & C North America Inc.*, Petitioners v. *Cambria Company LLC*, Patent Owner, US Patent and Trademark Office, Case No. IPR 2021-00216, U.S. Pat. No. 10,195,762, Notice of Filing Date Accorded to Petition and Time for Filing Patent Owner Preliminary Response, 5 pages, Dec. 15, 2020.
*Cosentino S.A.U and C & C North America Inc.*, Petitioners v. *Cambria Company LLC*, Patent Owner, US Patent and Trademark Office, Case No. IPR 2021-00216, U.S. Pat. No. 10,195,762, Patent Owners Mandatory Notices Pursuant to 37 C.F.R, 42.8, 5 pages, filing date Dec. 15, 2020.
*Cosentino S.A.U and C & C North America Inc.*, Petitioners v. *Cambria Company LLC*, Patent Owner, US Patent and Trademark Office, Case No. PGR 2021-00010, U.S. Pat. No. 10,773,418, Declaration of Dr. John R. Dorgan in Support of Petition for Inter Partes Review of U.S. Pat. No. 10,773,418, Cosentino Exhibit No. 1004, 169 pages, filing date Nov. 24, 2020.
*Cosentino S.A.U and C & C North America Inc.*, Petitioners v. *Cambria Company LLC*, Patent Owner, US Patent and Trademark Office, Case No. PGR2021-00010 U.S. Pat. No. 10,773,418, Notice of Filing Date Accorded to Petition and Time for Filing Patent Owner Preliminary Response, 6 pages, Dec. 9, 2020.
*Cosentino S.A.U and C & C North America Inc.*, Petitioners v. *Cambria Company LLC*, Patent Owner, US Patent and Trademark Office, Case No. PGR2021-00010, U.S. Pat. No. 10,773,418, Petition for Post Grant Review of U.S. Pat. No. 10,773,418, 120 pages, filing date Nov. 24, 2020.
*Cosentino S.A.U and C & C North America Inc.*, Petitioners v. *Cambria Company LLC*, Patent Owner, US Patent and Trademark Office, Case No. PGR2021-00010, U.S. Pat. No. 10,773,418, Patent Owners Mandatory Notices Pursuant to 37 C.F.R, 42.8, 5 pages, filing date Dec. 15, 2020.
*Cosentino S.A.U and C & C North America Inc.*, Petitioners v. *Cambria Company LLC*, Patent Owner, US Patent and Trademark Office, Civil Action 6:20-CV-00894-ADA, Declaration of Kevin P. Trumble, Ph.D., in Support of Plaintiffs Motion for Preliminary Injunction, Cosentino Exhibit No. 1014 in Case IPR2021-00215, 62 pages, filing date Nov. 24, 2020.
*Cosentino S.A.U and C & C North America Inc.*, Petitioners v. *Cambria Company LLC*, Patent Owner, US Patent and Trademark Office, Declaration of Dr. John Dorgan in Support of Petition for Inter Partes Review of U.S. Pat. No. 10,195,762, Cosentino Exhibit No. 1004 in Case IPR2021-00216, 222 pages, filing date Nov. 24, 2020.
Cosentino's, Caroline Summer Granite Brown Kitchen Countertop Item #416339Model #902166, published on or before Aug. 21, 2017, retrieved on Sep. 7, 2021, retrieved from URL <https://www.lowes.com/pd/SenSa-Caroline-Summer-Granite-Kitchen-Countertop-Sample/50142019?cm_mmc=shp-_-c-_-prd-_-kab-_-google-_-pla-_-233-_-soscountertopproductandaccess-_-50142019-_-0&placeholder=null&ds_rl=1286981&gclid=EAIaIQobChMIj-jD1ZuQ8AIVaz-6tBh0wowA1EAQYBSABEgLIKPD_BwE&gclsrc=aw.ds> 11 pages.
Countertops and Architectural Surfaces, The Official Publication of the International Surface Fabricators Association, vol. 8, Issue 1, Quarter 1, 2015, Cosentino Exhibit No. 1023 in Cases IPR2021-00214, IPR2021-00215, IPR2021-00216, and PGR2021-00010, 52 pages, filing date Nov. 24, 2020.
DiClerico, "What is the Difference Between Quartz and Quartzite?", Exhibit K, Cosentino Exhibit No. 1022 in Cases IPR2021-00214, IPR2021-00215, IPR2021-00216, and PGR2021-00010, 3 pages. Apr. 9, 2016.
Exhibit J, Galloway Cambria 2015, Cosentino Exhibit No. 1021 in Cases IPR2021-00214, IPR2021-00215, IPR2021-00216, and PGR2021-00010, 3 pages, filing date Nov. 24, 2020.
Extended European Search Report issued in European Application No. 15833790.7, dated Apr. 13, 2018, 10 pages.
Extended European Search Report issued in European Application No. 16744157.5, dated Nov. 6, 2018, 9 pages.
Freedman, "Clay Product-Faced Precast Concrete Panels," PCI Journal, Jan.-Feb. 1994, 39: 20-36, 17 pages.
HanStone Quarts by Hanwha Surfaces "Specifications", HanStone Quarts, Cosentino Exhibit No. 1011 in Cases IPR2021-00214, IPR2021-00215, IPR2021-00216, and PGR2021-00010, 48 pages, filing date Nov. 24, 2020.
International Preliminary Report on Patentability for PCT/US2015/045693, dated Mar. 2, 2017, 8 pages.
International Preliminary Report on Patentability in International Application No. PCT/US2016/015536, dated Aug. 10, 2017, 7 pages.
International Search Report and Written Opinion for PCT/US2015/045693, dated Jan. 4, 2016, 17 pages.
International Search Report and Written Opinion for PCT/US2016/15536, dated Apr. 25, 2016, 15 pages.
Invention Patent Application for Chinese Publication No. 102806599 A, "Quartz stone with predetermined three-dimensional colored patterns and linear patterns and preparation method thereof", English Translation and Certification, Exhibit 1006 in Cases IPR2021-00214, IPR2021-00215, IPR2021-00216, and PGR2021-00010, 54 pages, dated Dec. 5, 2012,.
Invention Patent Application for WO Publication No. 2008/000168, "A Mold System for Making the Products With Multi-Color 3D Patterns and its Methods", English Translation and Certification, Exhibit 1008 in Cases IPR2021-00214, IPR2021-00215, IPR2021-00216, and PGR2021-00010, 63 pages, dated Jan. 3, 2008.
Invitation to Pay for PCT/US2015/045693, dated Oct. 20, 2015, 2 pages.
Kai Herrmann, "5th pole Golden abstract" photograph, available on or before Jan. 1, 2009, retrieved on Sep. 7, 2021, retrieved from URL <https://www.saatchiart.com/art/Photography-5th-pole-golden-abstract/262364/1237075/view>, 6 pages.
MSI, "The Tmth About Calacatta Marble", Jan. 23, 2013, Cosentino Exhibit No. 1018 in Cases IPR2021-00214, IPR2021-00215, IPR2021-00216, and PGR2021-00010, 12 pages, filing date Nov. 24, 2020.
Neal's Design Remodel, Granite vs. Quartz in the Kitchen, May 23, 2011, retrieved on Sep. 7, 2021, <https://www.youtube.com/watch?app=desktop&v=2d3XcgtUybU> [Video Submission].
Ninevian, "Abstract vector seamless background wallpaper stock ID:477881937", published on Aug. 28, 2013, retrieved on Sep. 7, 2021, retrieved from URL <https://www.istockphoto.com/vector/abstract-vector-seamless-background-wallpaper-gm477881937-26697001>, 8 pages.
Professor John R. Dorgan Curriculum, Chemical Engineering and Materials Sciences Michigan State University, Cosentino Exhibit No. 1003 in Cases IPR2021-00214, IPR2021-00215, IPR2021-00216, and PGR2021-00010, 9 pages, filing date Nov. 24, 2020.
Stone & Tile Shoppe, Inc., "12×12 Granite Field Tile SKU: ISHT1134", published on or before May 1, 2019, 1 page.
Stonecontact.com [online], "Artificial Stone Factory Price Calacatta Marble Vein Quartz Slabs", available on or before Sep. 7, 2021, retrieved on Sep. 7, 2021, retrieved from URL, <https://www.stonecontact.com/products-a642705/artificial-stone-factory-price-calacatta-marble-vein-quartz-slabs> , 8 pages.

(56) References Cited

OTHER PUBLICATIONS

Vadaraquartz.com [online], "Vadara Collections", available on or before Sep. 20, 2020, via Internet Archive: Wayback Machine URL <http://web.archive.org/web/20200920181351/https://www.vadaraquartz.com/colors/> retrieved on Sep. 7, 2021, URL, <https://www.vadaraquartz.com/colors/>, 16 pages.
Yip, "Design innovations change the game in kitchen renovations", The Washington Post, Apr. 18, 2014, Exhibit I, Cosentino Exhibit No. 1020 in Cases IPR2021-00214, IPR2021-00215, IPR2021-00216, and PGR2021-00010, 4 pages, filing date Nov. 24, 2020.
"Certificate of Service of Complaint in *Cambria Company LLC* v. *Hirsch Glass Corp.*," Exhibit 1034 in IPR2022-00582, dated Feb. 11, 2022, 1 page.
"Certificate of Service of Complaint in *Cambria Company LLC* v. *Hirsch Glass Corp.*," Exhibit 1034 in IPR2022-00583, dated Feb. 11, 2022, 1 page.
"Certificate of Service of Complaint in *Cambria Company LLC* v. *Hirsch Glass Corp.*," Exhibit 1034 in IPR2022-00589, dated Feb. 11, 2022, 1 page.
"Curriculum Viate of Pierpaolo Tassone," Exhibit 1033 in IPR2022-00582, dated Feb. 11, 2022, 4 pages.
"Curriculum Viate of Pierpaolo Tassone," Exhibit 1033 in IPR2022-00583, dated Feb. 11, 2022, 4 pages.
"Declaration of Al Pacheco," Exhibit 1028 in IPR2022-00582, dated Feb. 10, 2022, 4 pages.
"Declaration of Al Pacheco," Exhibit 1028 in IPR2022-00583, dated Feb. 10, 2022, 4 pages.
"Declaration of Pierpaolo Tassone," Exhibit 1004 in IPR2022-00589, dated Feb. 8, 2022, 208 pages.
"Declaration of Pierpaolo Tassone," Exhibit 1031 in IPR2022-00582, dated Feb. 9, 2022, 123 pages.
"Declaration of Pierpaolo Tassone," Exhibit 1032 in IPR2022-00583, dated Feb. 9, 2022, 133 pages.
"MS International, Inc. General eBrochure 2014," Exhibit 1027 in IPR2022-00583 and IPR2022-00582, dated Feb. 28, 2014, 164 pages.
"MSI Surfaces, The Truth About Calacatta Marble," Exhibit 1029 in IPR2022-00583 and IPR2022-00582, dated Jan. 23, 2013, 13 pages.
"What is the Standard Width of a Kitchen Countertop," Exhibit 1035 in IPR2022-00583 and IPR2022-00582, dated Aug. 30, 2019, 6 pages.
*Hirsch Glass Corp., d/b/a Spectrum Quartz*, Petitioner, v. *Cambria Company LLC*, Case No. IPR2022-00582, Patent Owner; U.S. Pat. No, 9,718,303, filed on Feb. 11, 2022, 174 pages.
*Hirsch Glass Corp., d/b/a Spectrum Quartz*, Petitioner, v. *Cambria Company LLC*, Case No. IPR2022-00583, Patent Owner; U.S. Pat. No, 10,300,626, filed on Feb. 11, 2022, 172 pages.
*Hirsch Glass Corp., d/b/a Spectrum Quartz*, Petitioner, v. *Cambria Company LLC*, Case No. IPR2022-00589, Patent Owner; U.S. Pat. No, 9,993,942, filed on Feb. 10, 2022, 184 pages.
Prosecution History of U.S. Pat. No. 10,300,626, Exhibit 1024 in IPR2022-00583, filed Feb. 11, 2022, 263 pages.
Prosecution History of U.S. Pat. No. 9,186,819, Exhibit 1003 in IPR2022-00589, filed Feb. 9, 2022, 207 pages.
Prosecution History of U.S. Pat. No. 9,718,303, Exhibit 1022 in IPR2022-00580, filed Feb. 11, 2022, 160 pages.
Prosecution History of U.S. Pat. No. 9,993,942, Exhibit 1002 in IPR2022-00589, filed Feb. 10, 2022, 470 pages.
Amendment Under 37 C.F.R. § 1.111, U.S. Appl. No. 15/911,547 to Benito Lopez et al., Nov. 24, 2020, 15 pages.
BretonUSA.com [online], "Bretonstone," 2019, retrieved on May 19, 2022, retrieved from URL<https://www.bretonusa.com/en/stone/news/bretonstone-bridge-saws>, 17 pages.
Certified English Translation of Chinese Application for Invention Patent Publication No. CN 1718403A to Liu, Exhibit No. 1007 in IPR2022-00589, dated Feb. 2022, pages.
Patent Owner's Preliminary Response Under 37 C.F.R § 42.107, Case No. IPR2022-00582, Patent Owner; U.S. Pat. No, 9,718,303, filed May 17, 2022, 64 pages.
Patent Owner's Preliminary Response Under 37 C.F.R § 42.107, Case No. IPR2022-00583, Patent Owner; U.S. Pat. No, 10,300,626, filed May 17, 2022, 67 pages.
Patent Owner's Preliminary Response Under 37 C.F.R § 42.107, Case No. IPR2022-00589, Patent Owner; U.S. Pat. No, 9,993,942, filed May 17, 2022, 71 pages.
Caesarstone SA, [online], "A Day in the Life of Calacatta Nuvo," published Jul. 31, 2014, retrieved on Jul. 11, 2022, <https://www.youtube.com/watch?v=kBHY49Yt-pA>, 2 pages [Video Submission].
Caesarstone, "5000 London Grey (Classico Collection)," available on or before Jun. 7, 2014, via Internet Archive: Wayback Machine URL <https://web.archive.org/web/20140607083424/http://www.caesarstoneus.com:80/en/The-Catalog/Pages/By-Color.aspx>, retrieved on Jul. 22, 2022, URL<http://www.caesarstoneus.com:80/en/The-Catalog/Pages/By-Color.aspx>, 2 pages.
Caesarstone, "5100 Vanilla Noir (Classico Collection),"available on or before Aug. 8, 2015, via Internet Archive: Wayback Machine URL <https://web.archive.Org/web/20150808055120/http://www.caesarstoneus.com:80/en/The-Catalog/Pages/By-Color.aspx>, retrieved on Jul. 22, 2022, URL <http://www.caesarstoneus.com/en/The-Catalog/Pages/By-Color.aspx>, 2 pages.
Caesarstone, "5110 Alpine Mist (Classico Collection),"available on or before Aug. 8, 2015, via Internet Archive: Wayback Machine URL<https://web.archive.org/web/20150808055120/http://www.caesarstoneus.com:80/en/The-Catalog/Pages/By-Color.aspx>, retrieved on Jul. 22, 2022, URL <http://www.caesarstoneus.com/en/The-Catalog/Pages/By-Color.aspx>, 2 pages.
Caesarstone, "5131 Calacatta Nuvo (Classico Collection)," available on or before Aug. 10, 2015, via Internet Archive: Wayback Machine URL<https://web.archive.org/web/20150808055120/http://www.caesarstoneus.com:80/en/The-Catalog/Pages/By-Color.aspx>, retrieved on Jul. 22, 2022, URL <http://www.caesarstoneus.com/en/The-Catalog/Pages/By-Color.aspx>, 2 pages.
Cosentino, "Alpina White (Mountain Series),"available on or before Aug. 5, 2020, via Internet Archive: Wayback Machine URL<https://web.archive.org/web/20200805132726/https://www.cosentino.com/USA/colors/silestone/a lpina-white-08/>, retrieved on Jul. 22, 2022, URL<https://www.cosentino.com/USA/colors/silestone/alpina-white-08/>, 6 pages.
Cosentino, "Ariel (Nebula Alpha Series)," available on or before Jul. 21, 2020, via Internet Archive: Wayback Machine URL<https://web.archive.org/web/20200721053719/https://www.cosentino.com/USA/colors/silestone/a riel/>, retrieved on Jul. 22, 2022, URL<https://www.cosentino.com/USA/colors/silestone/ariel/>, 6 pages.
Cosentino, "Blanco Orion (Nebula Alpha Series)," available on or before Jun. 13, 2020, via Internet Archive: Wayback Machine URL<https://web.archive.org/web/20200613145214/https://www.cosentino.com/USA/colors/silestone/b lanco-orion/>, retrieved on Jul. 22, 2022, retrieved from URL<https://www.cosentino.com/USA/colors/silestone/blanco-orion/>, 6 pages.
Houzz.com [online], "Has anybody had Caesarstone calacatta nuvo countertop installed?," 2015, retrieved on Jul. 11, 2022, retrieved from URL <https://www.houzz.com/discussions/2925409/has-anybody-had-caesarstone-calacatta-nuvo-countertop-installed>, 15 pages.
LG Viatera, "Olive Rust,"available on or before Jan. 26, 2021, via Internet Archive: Wayback Machine URL<https://web.archive.org/web/20210126221030/https://riostones.com/project/lg-viatera-olive-rust/>, retrieved on Jul. 22, 2022, retrieved from URL<https://riostones.com/project/lg-viatera-olive-rust/>, 16 pages.
LG Viatera," Silver Lake," available on or before May 13, 2021, via Internet Archive: Wayback Machine URL<https://web.archive.org/web/20210513054738/https://gramarstone.com/product/silver-lake-lg-viatera/>, retrieved on Jul. 22, 2022, retrieved from URL<https://gramarstone.com/product/silver-lake-lg-viatera/>, 6 pages.
LG Viatera, "Solano,"available on or before May 29, 2019, via Internet Archive: Wayback Machine URL<https://web.archive.org/web/20190529193915/http://granitetops.com/quartz/lg-viatera/solano/>, retrieved on Jul. 22, 2022, retrieved from URL<http://granitetops.com/quartz/lg-viatera/solano/>, 2 pages.
LG Viatera, "Solar Canyon," available on or before May 29, 2019, via Internet Archive: Wayback Machine URL<https://web.archive.

(56) References Cited

OTHER PUBLICATIONS org/web/20190529232930/http://granitetops.com/quartz/lg-viatera/solar-canyon/>, retrieved on Jul. 22, 2022, retrieved from URL<http://granitetops.com/quartz/lg-viatera/solar-canyon/>, 2 pages.
LG Viatera, "Symphony," available on or before May 30, 2019, via Internet Archive: Wayback Machine URL<https://web.archive.org/web/20190530032716/http://granitetops.com/quartz/lg-viatera/symphony/>, retrieved on Jul. 22, 2022, retrieved from URL<http://granitetops.com/quartz/lg-viatera/symphony/>, 2 pages.
LG Viatera, "Wildwood," available on or before Mar. 2021, via Internet Archive: Wayback Machine URL<https://web.archive.org/web/20210303145950/https://granitetops.com/quartz/lg-viatera/wildwood/>, retrieved on Jul. 22, 2022, retrieved from URL<https://granitetops.com/quartz/lg-viatera/wildwood/>, 2 pages.
Pentalquartz, "BQ9438 (Kalahari)," available on or before Aug. 25, 2014, via Internet Archive: Wayback Machine URL<https://web.archive.org/web/20140825015513/http://www.penta lquartz.com/catalog/collection>, retrieved on Jul. 22, 2022, retrieved from URL<http://www.pentalquartz.com/catalog/collection>, 3 pages.
Pentalquartz, "Products," available on or before Oct. 19, 2018, via Internet Archive: Wayback Machine URL<https://web.archive.org/web/20181019011447/https://pentalquartz.com/products/>, retrieved on Jul. 22, 2022, URL<https://pentalquartz.com/products/>, 4 pages.
Pentalquartz.Com, "BQ8270 (Calacatta)," available on or before Jun. 13, 2013, via Internet Archive: Wayback Machine URL<https://web.archive.org/web/20140624142421/http ://www. penta lquartz.com:80/catalog/collection>, retrieved on Jul. 22, 2022, retrieved from URL<http://www.pentalquartz.com/catalog/collection>, 3 pages.
Silestone, "Arctic (Ocean Series)," available on or before Aug. 8, 2020, via Internet Archive: Wayback Machine URL<https://web.archive.org/web/20200808141917/https://www.prosourcewholesale.com/products/oc ean-series_arctic_34808972>, retrieved on Jul. 22, 2022, URL<https://www.prosourcewholesale.com/products/ocean-series arctic 34808972>, 4 pages.
Silestone, "Black Canyon (Mountain Series)," available on or before May 29, 2016, via Internet Archive: Wayback Machine URL<https://web.archive.org/web/20160529221616/http://www.silestoneusa.com:80/color/black-canyon>, retrieved on Jul. 22, 2022, URL<http://www.silestoneusa.com/color/black-canyon>, 6 pages.
Silestone, "Galactic Series," available on or before Aug. 10, 2014, via Internet Archive: Wayback Machine URL<https://web.archive.org/web/20140810130618/http://www.sile-stone.com:80/galactic/>, retrieved on Jul. 22, 2022, retrieved from URL<http://www.sile-stone.com/galactic/>, 4 pages.
Silestone, "Giallo Nov (Galactic Series)," available on or before Jun. 24, 2012, via Internet Archive: Wayback Machine URL<https://web.archive.org/web/20120624032422/http://www.marblecity ca.com/stones/giallo-nova>, retrieved on Jul. 22, 2022, retrieved from URL<http://www.marblecityca.com/stones/giallo-nova>, 2 pages.
Silestone, "Giallo Quarry (Mountain Series)," available on or before Mar. 15, 2016, via Internet Archive: Wayback Machine URL<https://web.archive.org/web/20160315033027/https://graniteselection.com/silestone-countertops/giallo-quarry/>, retrieved on Jul. 22, 2022, retrieved from URL<https://graniteselection.com/silestone-countertops/giallo-quany/>, 4 pages.
Silestone, "Halley (Galactic Series)," available on or before Aug. 10, 2014, via Internet Archive: Wayback Machine URL<https://web.archive.org/web/20140810130618/http://www.sile-stone.com/galactic/>, retrieved on Jul. 22, 2022, retrieved from URL<http://www.sile-stone.com/galactic/>, 4 pages.
Silestone, "Helix (Nebula Code Series)," available on or before Apr. 26, 2016, via Internet Archive: Wayback Machine URL<https://web.archive.org/web/20160426050338/http://www.silestoneusa.com/colors/series/nebula-code-series/>, retrieved on Jul. 22, 2022, retrieved from URL<http://www.silestoneusa.com/colors/series/nebula-code-series/>, 4 pages.
Silestone, "Lagoon (Nebula Series)," available on or before May 25, 2020, via Internet Archive: Wayback Machine URL<https://web.archive.org/web/20200525173958/https://www.cosentino.com/colors/silestone/lagoo n/>, retrieved on Jul. 22, 2022, retrieved from URL<https://www.cosentino.com/colors/silestone/lagoon/>, 6 pages.
Silestone, "Mountain Series," available on or before Jun. 13, 2013, via Internet Archive: Wayback Machine URL<https://web.archive.org/web/20130613000403/https://www.silestoneusa.com/colors/series/moun tain-series/>, retrieved on Jul. 22, 2022, retrieved from URL<https://www.silestoneusa.com/colors/series/mountain-series/>, 2 pages.
Silestone, "Nebula Alpha Series," available on or before Jun. 5, 2016, via Internet Archive: Wayback Machine URL<https://web.archive.org/web/20160605011034/http://www.silestoneusa. com:80/nebula-alpha-series/>, retrieved on Jul. 22, 2022, retrieved from URL<http://www.silestoneusa.com/nebula-alpha-series/>, 6 pages.
Silestone, "Nubula Code Series," available on or before Nov. 10, 2016, via Internet Archive: Wayback Machine URL<https://web.archive.org/web/20161110074359/http://www.silestoneusa.com/nebula-code-series/>, retrieved on Jul. 22, 2022, retrieved from URL<http://www.silestoneusa.com/nebula-code-series/>, 7 pages.
Silestone, "Ocean Series," available on or before Jun. 8, 2016, via Internet Archive: Wayback Machine URL<https://web.archive.org/web/20160608040618/http://www.silestoneusa.com:80/colors/series/oce an-series/>, retrieved on Jul. 22, 2022, retrieved from URL<http://www.silestoneusa.com/colors/series/ocean-series/>, 8 pages.
Silestone, "Stonium Series," available on or before Aug. 10, 2014, via Internet Archive: Wayback Machine URL<https://web.archive.org/web/20140810130326/http://www.sile-stone.com/stonium/>, retrieved on Jul. 22, 2022, retrieved from URL<http://www.sile-stone.com/stonium/>, 4 pages.
Viatera, "Everest," available on or before Oct. 23, 2014, via Internet Archive: Wayback Machine URL<https://web.archive.org/web/20141023044628/http://www.lgviaterausa.com/productOverviews/0/83/by-product-line>, retrieved on Jul. 22, 2022, retrieved from URL<http://www.lgviaterausa.com/productOverviews/Q/83/by-product-line>, 2 pages.
Vicostone, "BQ8380 (Pietra Grey)," available on or before Jun. 13, 2013, via Internet Archive: Wayback Machine URL<https://web.archive.org/web/20131217164327/http://vicostone.com/our-product/vicostone-quartz-surfaces/#!pretlyPhoto>, retrieved on Jul. 22, 2022, URL<http://vicostone.com/our-product/vicostone-quartz-surfaces/>, 4 pages.
Vicostone, "BQ8440 (Bianco Venato)," available on or before Dec. 17, 2013, via Internet Archive: Wayback Machine URL<https://web.archive.org/web/20131217164327/http://vicostone.com/our-product/vicostone-quartz-surfaces/>, retrieved on Jul. 22, 2022, URL<http://vicostone.com/our-product/vicostone-quartz-surfaces/>, 4 pages.
Vicostone, "BQ8628 (Statuario)," available on or before Sep. 17, 2014, via Internet Archive: Wayback Machine URL<https://web.archive.org/web/20140917232746/http://vicostone.com:80/our-product/vicostone-quartz-surfaces/>, retrieved on Jul. 22, 2022, URL<http://vicostone.com/our-product/vicostone-quartz-surfaces/> 4 pages.
Vicostone, "Exotic Collection," available on or before Sep. 17, 2014, via Internet Archive: Wayback Machine URL<https://web.archive.org/web/20200810110033/https://us.vicostone.com/en/quartz-stone/surfaces?collection=Exotic>, retrieved on Jul. 22, 2022, URL<https://US.vicostone.com/en/quartz-stone>, 10 pages.
Vicostone, "Products," available on or before Dec. 17, 2013, via Internet Archive: Wayback Machine URL<https://web.archive.org/web/20131217164327/http://vicostone.com/our-product/vicostone-quartz-surfaces/>, retrieved on Jul. 22, 2022, URL<http://vicostone.com/our-product/vicostone-quartz-surfaces/>, 4 pages.
Cabinets & Designs Incorporated, [online] "A Look Into Cosentino," May 17, 2011, retrieved from URL <https://www.cabinetsanddesigns.net/a-look-into-cosentino/>, 3 pages.
Cosentino News: Newsletter/ Anaheim Edition, "Cosentino Connection," Sep. 2011, 4 pages.
Cosentino News: Newsletter/ Atlanta Edition, "Cosentino Connection," Sep. 2011, 4 pages.
Cosentino News: Newsletter/ Colorado Edition, "Cosentino Connection," Sep. 2011, 4 pages.
Cosentino News: Newsletter/ Dallas Edition, "Cosentino Connection," Sep. 2011, 4 pages.

(56) References Cited

OTHER PUBLICATIONS

Cosentino News: Newsletter/ Miami Edition, "Cosentino Connection," Sep. 2011, 4 pages.
Cosentino News: Newsletter/NorthBorough Mass Edition, "Cosentino Connection," Sep. 2011, 4 pages.
Cosentino News: Newsletter/ Orlando Edition, "Cosentino Connection," Sep. 2011, 4 pages.
Cosentino News: Newsletter/ San Francisco Edition, "Cosentino Connection," Sep. 2011, 4 pages.
Cosentino News: Newsletter/ San Marcos Edition, "Cosentino Connection," Sep. 2011, 4 pages.
Cosentino News: Newsletter/ Seattle Edition, "Cosentino Connection," Sep. 2011, 4 pages.
Cosentino News: Newsletter/ Washington Edition, "Cosentino Connection," Sep. 2011, 4 pages.
Cosentino Surfaces, "Your Destination For Luxury Stone," Sep. 2015, 11 pages.
Cosentino, "Authentic Kitchen & Bath," May 11, 2013, 2 pages.
Cosentino, "Color Catalog," Apr. 1, 2012, 12 pages.
Cosentino, "Cosentino Connection," believed to be available No. later than May 1, 2012, 7 pages.
Cosentino, "Cosentino Contract," available on or before Sep. 19, 2015, 43 pages.
Cosentino, "Cosentino Group presents its latest collections for the US market at the Kitchen & Bath Industry Show 2012," 2012, 2 pages.
Cosentino, "Silestone Launches New Galactic Series Inspired By Natural Movement," Jul. 2011, 3 pages.
Cosentino, "Table of Content," retrieved on Aug. 9, 2022 51 pages.
Cosentino, [online] "kbis 2013," 2013, retrieved from URL<www.cosentino-group.net>, 7 pages.
Cosentino, [online] "kbis 2014," 2014, retrieved from URL<www.cosentino-group.net>, 9 pages.
Cosentino, [online] "Silestone Gets Down to Earth with New Colors," Sep. 28, 2007, 2 pages.
Cosentino, "2014 Price Guide," believed to be available No. later than 2/29/2014, 44 pages.
Cosentino, "Fall 2013 Price Guide," revised Jul. 1, 2013, 47 pages.
Cosentino, "Fall 2013 Price Guide," believed to be available No. later than Aug. 29, 2013, 46 pages.
Cosentino, "Price Guide FALL 2015," revised Sep. 2015, 23 pages.
Cosentino, "PRICES Product 2012," available No. later than 2012, 17 pages.
Cosentino, "Product Guide 2015," available on or before Dec. 1, 2014, 23 pages.
Cosentino, "Product Guide 2015," revised Dec. 2014, 23 pages.
Countertop Resource.com, [online] "Cosentino Introduces 6 New 'Ocean' Silestone Colors," Feb. 3, 2014, retrieved from URL <https://countertopresource.com/cosentino-introduces-6-new-ocean-silestone-colors/>, 5 pages.
Deavita.Net, "Santa Cecilia granite countertops for a fresh and modern kitchen," available on or before Aug. 19, 2014, retrieved from URL<http://deavita.net/santa-cecilia-granite-countertops-modem-kitchen,html>, 15 pages.
Deyogroup.Com, "Bavaria 3CM," available on or before Dec. 26, 2013, via Internet Archive: Wayback Machine URL <https://web.archive.org/web/20131226074755im /http://resource.deyogroup.com/278/Bavaria_3cm.j pg>, retrieved on Aug. 12, 2022, URL<http://resource.deyogroup.com/278/Bavaria_3cm.jpg>, 1 page.
Deyogroup.Com, "Copper Canyon 3CM W," available on or before Dec. 26, 2013, via Internet Archive: Wayback Machine URL <https://web.archive.org/web/20131226090227im /http://resource.deyogroup.com/278/COPPER-CANYON-3CM-(VV).jpg>, retrieved on Aug. 12, 2022, URL<http://resource.deyogroup.com/278/COPPER-CANYON-3CM-(VV).jpg>, 1 page.
Deyogroup.Com, "Copper Canyon 3CM," available on or before Dec. 26, 2013, via Internet Archive: Wayback Machine URL <https://web.archive.org/web/20131226073218im /http://resource.deyogroup.com/278/COPPER-CANYON-3CM.jpg>, retrieved on Aug. 12, 2022, URL<http://resource.deyogroup.com/278/COPPER-CANYON-3CM.jpg>, 1 page.
DeyoGroup.Com, "Giallo Fiorito 2CM," available on or before Dec. 26, 2013, via Internet Archive: Wayback Machine URL <https://web.archive.org/web/20131226090836im /http://resource.deyogroup.com/278/GIALLO-FIORITO-2CM.jpg>, retrieved on Aug. 9, 2022, URL<http://resource.deyogroup.com/278/GIALLO-FIORITO-2CM,jpg>, 1 page.
DeyoGroup.Com, "Giallo Fiorito 3CM," available on or before Dec. 26, 2013, via Internet Archive: Wayback Machine URL <https://web.archive.org/web/20131226072257im /http://resource.deyogroup.com/278/GIALLO-FIORITO-3CM.jpg>, retrieved on Aug. 9, 2022, URL<http://resource.deyogroup.com/278/GIALLO-FIORITO-3CM,jpg>, 1 page.
DeyoGroup.Com, "Giallo Fiorito 3CM," available on or before Dec. 26, 2013, via Internet Archive: Wayback Machine URL <https://web.archive.org/web/20131226075642im /http://resource.deyogroup.com/278/GIALLO-FIORITO-3CM-(STANDARD).jpg>, retrieved on Aug. 9, 2022, URL<http://resource.deyogroup.com/278/GIALLO-FIORITO-3CM-(STANDARD).jpg>, 1 page.
DeyoGroup.Com, "Jupcremabordeaux," available on or before Dec. 26, 2013, via Internet Archive: Wayback Machine URL <https://web.archive.org/web/20131226084009im /http://resource.deyogroup.com/278/jupcremaborde aux(1).jpg>, retrieved on Aug. 12, 2022, URL<http://resource.deyogroup.com/278/jupcremabordeaux(1).jpg>, 1page.
DeyoGroup.Com, "Lapidus LG," available on or before Dec. 26, 2013, via Internet Archive: Wayback Machine URL <https://web.archive.org/web/20131226073317im /http://resource.deyogroup.com/278/Lapidus LG.jp g>, retrieved on Aug. 9, 2022, URL<http://resource.deyogroup.com/278/Lapidus LG.jpg>, 1 page.
DeyoGroup.Com, "Lapidus W 2CM Lg Sample," available on or before Dec. 26, 2013, via Internet Archive: Wayback Machine URL <https://web.archive.org/web/20131223074850im /http://resource.deyogroup.com/278/Lapidus-W 2cm Lg Sample.jpg>, retrieved on Aug. 9, 2022, URL<http://resource.deyogroup.com/278/Lapidus-W 2cm Lg Sample.jpg>, 1 page.
DeyoGroup.Com, "LG Caledonia," available on or before Dec. 26, 2013, via Internet Archive: Wayback Machine URL <https://web.archive.org/web/20131226083354im /http://resource.deyogroup.com/278/Caledonia LG. jpg>, retrieved on Aug. 9, 2022, URL<http://resource.deyogroup.com/278/Caledonia LG.jpg>, 1 page.
DeyoGroup.Com, "LG Floral Fantastico," available on or before Dec. 26, 2013, via Internet Archive: Wayback Machine URL <https://web.archive.org/web/201312260803364im /http://resource.deyogroup.com/278/FloralFantasti co_LG.jpg>, retrieved on Aug. 9, 2022, URL<http://resource.deyogroup.com/278/FloralFantastico LG.jpg>, 1 page.
DeyoGroup.com, "Luna Pearl 2CM" available on or before Dec. 26, 2013, via Internet Archive: Wayback Machine URL <https://web.archive.org/web/2013122608371 lim /http://resource.deyogroup.com/278/LUNA-PEARL-2CM.jpg>, retrieved on Aug. 9, 2022, URL<http://resource.deyogroup.com/278/LUNA-PEARL-2CM.jpg>, 1 page.
DeyoGroup.com, "Santa Cecilia 2CM Standard," available on or before Dec. 26, 2013, via Internet Archive: Wayback Machine URL <https://web.archive.org/web/20131226075424im /http://resource.deyogroup.com/278/SANTA-CECILIA-2CM-(STANDARD).jpg>, retrieved on Aug. 9, 2022, URL<http://resource.deyogroup.com/278/SANTA-CECILIA-2CM-(STANDARD).jpg>, 1 page.
DeyoGroup.com, "Santa Cecilia 2CM," available on or before Dec. 26, 2013, via Internet Archive: Wayback Machine URL <https://web.archive.org/web/20131226082808im /http://resource.deyogroup.com/278/SANTA-CECILIA-2CM-(BG).jpg>, retrieved on Aug. 9, 2022, URL<http://resource.deyogroup.com/278/SANTA-CECILIA-2CM-(BG).jpg>, 1 page.
DeyoGroup.com, "Santa Cecilia 3CM Standard," available on or before Dec. 26, 2013, via Internet Archive: Wayback Machine URL <https://web.archive.org/web/20131226085740im /http://resource.deyogroup.com/278/SANTA-CECILIA-3CM-(STANDARD).jpg>, retrieved on Aug. 9, 2022, URL<http://resource.deyogroup.com/278/SANTA-CECILIA-3CM-(STANDARD).jpg>, 1 page.

(56) References Cited

OTHER PUBLICATIONS

DeyoGroup.com, "Santa Cecilia 3CM," available on or before Dec. 26, 2013, via Internet Archive: Wayback Machine URL <https://web.archive.org/web/20131226072044im /http://resource.deyogroup.com/278/SANTA-CECILIA-3CM.jpg>, retrieved on Aug. 12, 2022, URL<http://resource.deyogroup.com/278/SANTA-CECILIA-3CM.jpg>, 1 page.
DeyoGroup.com, "Santa Cecilia 3CM," available on or before Dec. 26, 2013, via Internet Archive: Wayback Machine URL <https://web.archive.org/web/20131226091225im /http://resource.deyogroup.com/278/SANTA-CECILIA-3CM-(BG).jpg>, retrieved on Aug. 9, 2022, URL<http://resource.deyogroup.com/278/SANTA-CECILIA-3CM-(BG).jpg>, 1 page.
DeyoGroup.com, "Santa Cecilia 3CM78 Prem," available on or before Dec. 26, 2013, via Internet Archive: Wayback Machine URL <https://web.archive.org/web/20131226072349im /http://resource.deyogroup.com/278/SANTA-CECILIA-3CM78-(PREM).jpg>, retrieved on Aug. 12, 2022, URL<http://resource.deyogroup.com/278/SANTA-CECILIA-3CM78-(PREM)>, 1 page.
DeyoGroup.com, "Santa Cecilia 3CM78 Std," available on or before Dec. 26, 2013, via Internet Archive: Wayback Machine URL <https://web.archive.org/web/20131226081729im /http://resource.deyogroup.com/278/SANTA-CECILIA-3CM78-(STD).jpg>, retrieved on Aug. 12, 2022, URL<http://resource.deyogroup.com/278/SANTA-CECILIA-3CM78-(STD).jpg>, 1 page.
DeyoGroup.com, "Siena Bordeaux 3CM Vs," available on or before Dec. 26, 2013, via Internet Archive: Wayback Machine URL <https://web.archive.org/web/20131226074204im/http://resource.deyogroup.com/278/SIENA-BORDEAUX-3CM-(VS).jpg>, retrieved on Aug. 12, 2022, URL<http://resource.deyogroup.com/278/SIENA-BORDEAUX-3CM-(VS),ipg>, 1 page.
DeyoGroup.com, "Silver Supreme," available on or before Dec. 26, 2013, via Internet Archive: Wayback Machine URL <https://web.archive.org/web/2013122614027lim /http://resource.deyogroup.com/278/silver_supreme jpg>, retrieved on Aug. 12, 2022, URL<http://resource.deyogroup.com/278/silver supreme.jpg>, 1 page.
DeyoGroup.com, "White Ice 3CM," available on or before Dec. 26, 2013, via Internet Archive: Wayback Machine URL <https://web.archive.org/web/2013122630846341m /http://resource.deyogroup.com/278/White_Ice_3c m.jpg>, retrieved on Aug. 12, 2022, URL</http://resource.deyogroup.com/278/White_Ice_3cm.jpg>, 1 page.
East West Marble Company, [online] "Marble," available on or before Nov. 30, 2012, via Internet Archive: Wayback Machine URL <https://web.archive.Org/web/20121130084317/http://ewmarble.com/index.php/marble/>, retrieved on Aug. 9, 2022, URL<http://ewmarble.com/index.php/marble/>, 2 pages.
Houzz.com [online], "Has anybody had Caesarstone calacatta nuvo countertop installed?," 2015, retrieved on Aug. 9, 2022, retrieved from URL <https://www.houzz.com/discussions/2925409/has-anybody-had-caesarstone-calacatta-nuvo-countertop-installed>, 14 pages.
KBIS.com, [online] "Cosentino Leads State of Industry Address and Presents New Products at KBIS 2014," Jan. 8, 2014, retrieved from URL <https://kbis.com/exhibitor-news/cosentino-leads-state-of-industry-address-and-presents-new-products-at-kbis-2014/>, 3 pages.
KBIS.com, [online] "Silestone Launches Nebula Alpha," Oct. 2014, retrieved from URL <https ://kbis.com/exhibitor-news/silestone-launches-nebula-alpha/>, 5 pages.
PentalQuartz.com, "A Look To Last Forever," available on or before Nov. 18, 2012, via Internet Archive: Wayback Machine URL <http://web.archive.org/web/20121118080919/http://www.pentalquartz.com/pentalquartz.html>, retrieved on Aug. 9, 2022, URL<http://www.pentalquartz.com/pentalquartz.html>, 3 pages.
PentalQuartz.com, "A Look To Last Forever," available on or before Nov. 7, 2012, via Internet Archive: Wayback Machine URL <http://web.archive.org/web/20121107045447/http://www.pentalquartz.com/>, retrieved on Aug. 9, 2022, URL<http://www.pentalquartz.com/>, 2 pages.
PentalQuartz.com, "Calacatta," available on or before Oct. 14, 2014, via Internet Archive: Wayback Machine URL <https://web.archive.org/web/20141014025924/http://www.pentalquartz.com/progallery/practice>, retrieved on Aug. 9, 2022, URL<http://www.pentalquartz.com/progallery/practice>, 2 pages.
PentalQuartz.com, "Collection," available on or before Dec. 19, 2013, via Internet Archive: Wayback Machine URL <https://web.archive.org/web/20131219040723/http://www.pentalquartz.com/catalog/collection>, retrieved on Aug. 9, 2022, URL<http://www.pentalquartz.com/catalog/collection>, 3 pages.
PentalQuartz.com, "Collection," available on or before Feb. 22, 2015, via Internet Archive: Wayback Machine URL <https://web.archive.org/web/20150222081510/http://www.pentalquartz.com/catalog/collection>, retrieved on Aug. 9, 2022, URL<http://www.pentalquartz.com/catalog/collection>, 3 pages.
PentalQuartz.com, "Everyday Surface. Timeless Beauty," available on or before Dec. 14, 2013, via Internet Archive: Wayback Machine URL <https://web.archive.org/web/20131214171457/http://www.pentalquartz.com/>, retrieved on Aug. 9, 2022, URL<http://www.pentalquartz.com/>, 1 page.
PentalQuartz.com, "Everyday Surface. Timeless Beauty," available on or before Feb. 19, 2015, via Internet Archive: Wayback Machine URL <https://web.archive.Org/web/20150219040815/http://www.pentalquartz.com/>, retrieved on Aug. 9, 2022, URL<http://www.pentalquartz.com/>, 1 page.
PentalQuartz.com, "Recent News: 5 New Colors Now in Stock," available on or before Feb. 10, 2015, via Internet Archive: Wayback Machine URL <https://web.archive.org/web/20150210174808/http://www.pentalquartz.com/blog/recent-news/post/5-new-colors-now-in-stock>, retrieved on Aug. 9, 2022, URL<http://www.pentalquartz.com/blog/recent-news/post/5-new-colors-now-in-stock>, 1 page.
PentalQuartz.com, "Recent News: PQ Announces the Launch of Calacatta," available on or before Dec. 2, 2013, via Internet Archive: Wayback Machine URL <https://web.archive.org/web/20131202020723/http://www.pentalquartz.com/blog/recent-news/post/pq-announces-the-launch-of-calacatta>, retrieved on Aug. 9, 2022, URL<http://www.pentalquartz.com/blog/recent-news/post/pq-announces-the-launch-of-calacatta/>, 1 page.
PentalQuartz.com, [online] "Collection," available on or before Jul. 13, 2013, via Internet Archive: Wayback Machine URL <https://web.archive.org/web/20130713075637/http://www.pentalquartz.com/catalog/collection>, retrieved on Aug. 9, 2022, URL<http://www.pentalquartz.com/catalog/collection>, 3 pages.
PentalQuartz.com, [online] "Products: Cappuccino," available on or before Nov. 10, 2015, retrieved on Aug. 9, 2022, retrieved from URL <http://pentalquartz.com/products/cappuccino/>, 2 pages.
PentalQuartz.com, [online] "Products: Cappuccino," available on or before Oct. 2, 2015, retrieved on Aug. 9, 2022, retrieved from URL <http://pentalquartz.com/products/cappuccino/>, 2 pages.
PentalQuartz.com, [online] "Products: Cappuccino," available on or before Sep. 27, 2020 retrieved on Aug. 9, 2022, retrieved from URL <http://pentalquartz.com/products/cappuccino/>, 1 page.
Pittsburgh Post-Gazette, [online] "Don't have to dish out tried and true when remodeling kitchen," Nov. 18, 2005, 6 pages.
Silestone [online], "Silestone: Mountain Series," retrieved on Aug. 9, 2022, 1081 pages [Video Submission].
Silestone by Cosentino, "New Nebula Alpha: Silestone Series," retrieved on Aug. 9, 2022, 10 pages.
Silestone, "Silestone Quartz," 2007, 4 pages.
Silestone, "Silestone: The Secure Brand," retrieved on Aug. 9, 2022,2 pages.
Stone World, "New study confirms commonly used granite is safe for countertops," May 22, 2008, 3 pages.
Verona Marble Company, "Live Inventory View," available on or before Dec. 15, 2012, via Internet Archive: Wayback Machine URL <https://web.archive.org/web/20121215025147/http://vmcstone.com/homeowners/naturalstone/granite/liveinventoryview>, retrieved on Aug. 9, 2022, URL<http://vmcstone.com/homeowners/naturalstone/granite/liveinventoryview>, 3 page.
Vicostone.Com, [online] "BQ8270" available on or before Feb. 13, 2015, via Internet Archive: Wayback Machine URL <https://web.archive.org/web/20150213081616/http://www.vicostone.com/wp-content/uploads/2014/04/BQ8270-Calacatta-408x408-l.jpg>, retrieved on Aug. 9, 2022, URL<http://www.vicostone.com/wp-content/uploads/2014/04/BQ8270-Calacatta-408x408-l.jpg>, 1 page.

(56) References Cited

OTHER PUBLICATIONS

Vicostone.Com, [online] "BQ8440" available on or before Feb. 13, 2015, via Internet Archive: Wayback Machine URL <https://web.archive.org/web/20150213083742/http://www.vicostone.com/wp-content/uploads/2013/07/BQ8440_408x408_100713.jpg>, retrieved on Aug. 9, 2022, URL<http://www.vicostone.com/wp-content/uploads/2013/07/BQ8440 408x408 100713,jpg>,1page.

Vicostone.Com, [online] "BQ8530" available on or before Feb. 13, 2015, via Internet Archive: Wayback Machine URL <https://web.archive.org/web/20150213081659/http://www.vicostone.com/wp-content/uploads/2013/07/BQ8530_408x408_100713.jpg>, retrieved on Aug. 9, 2022, URL<http://www.vicostone.com/wp-content/uploads/2013/07/BQ8530 408x408 100713,jpg>,1page.

Vicostone.Com, [online] "BQ8628" available on or before Feb. 13, 2015, via Internet Archive: Wayback Machine URL <https://web.archive.org/web/20150213081649/http://www.vicostone.com/wp-content/uploads/2014/09/BQ8628_big.png>, retrieved on Aug. 9, 2022, URL<http://www.vicostone.com/wp-content/uploads/2014/09/BQ8628 big.png>, 1 page.

Vicostone.Com, [online] "From the Classic Collection: Canary BQ9160," retrieved on Aug. 9, 2022, retrieved from URL<http://vicostone.com/en/quartz-stone/BQ9160>, 2 pages.

Vicostone.Com, [online] "From the Classic Collection: Champagne BQ2030," retrieved on Aug. 9, 2022, retrieved from URL<http://vicostone.com/en/quartz-stone/BQ2030>, 2 pages.

Vicostone.Com, [online] "From the Classic Collection: Nirvara BQ9140," retrieved on Aug. 9, 2022, retrieved from URL<http://vicostone.com/en/quartz-stone/BQ9140>, 2 pages.

Vicostone.Com, [online] "From the Classic Collection: Oyster BQ9330," retrieved on Aug. 9, 2022, retrieved from URL<http://vicostone.com/en/quartz-stone/BQ9330>, 2 pages.

Vicostone.Com, [online] "From the Exotic Collection: Calacatta BQ8270," retrieved on Aug. 9, 2022, retrieved from URL<http://vicostone.com/en/quartz-stone/BQ8270>, 2 pages.

Vicostone.Com, [online] "From the Natural Collection: Bianco Venato BQ8440," retrieved on Aug. 9, 2022, retrieved from URL<http://vicostone.com/en/quartz-stone/BQ8440>, 2 pages.

Vicostone.Com, [online] "From the Natural Collection: Gioia Carrara BQ8530," retrieved on Aug. 9, 2022, retrieved from URL<http://vicostone.com/en/quartz-stone/BQ8530>, 2 pages.

Vicostone.Com, [online] "From the Natural Collection: Serra BQ9418," retrieved on Aug. 9, 2022, retrieved from URL<http://vicostone.com/en/quartz-stone/BQ9418>, 2 pages.

Vicostone.Com, [online] "From the Natural Collection: Statuario BQ8628," retrieved on Aug. 9, 2022, retrieved from URL<http://vicostone.com/en/quartz-stone/BQ8628>, 2 pages.

Vicostone.Com, [online] "From the Natural Collection: Tobacco BQ9420," retrieved on Aug. 9, 2022, retrieved from URL<http://vicostone.com/en/quartz-stone/BQ9420>, 2 pages.

Vicostone.Com, [online] "Our Products" available on or before Dec. 17, 2013, via Internet Archive: Wayback Machine URL <https://web.archive.org/web/20131217164327/http://vicostone.com/our-product/vicostone-quartz-surfaces/>, retrieved on Aug. 9, 2022, URL<http://vicostone.com/our-product/vicostone-quartz-surfaces/>, 3 pages.

Vicostone.Com, [online] "Our Products" available on or before Jun. 15, 2012, via Internet Archive: Wayback Machine URL <http://web.archive.org/web/20120615213534/http://vicostone.com/our-product/vicostone-quartz-surfaces/>, retrieved on Aug. 9, 2022, URL<http://vicostone.com/our-product/vicostone-quartz-surfaces/>, 4 pages.

Vicostone.Com, [online] "Our Products" available on or before Sep. 17, 2014, via Internet Archive: Wayback Machine URL <https://web.archive.Org/web/20140917232746/http://www.vicostone.com/our-product/vicostone-quartz-surfaces/>, retrieved on Aug. 9, 2022, URL<http://vicostone.com/our-product/vicostone-quartz-surfaces/>, 4 pages.

Vicostone.Com, [online] "Our Products," available on or before Dec. 17, 2013, via Internet Archive: Wayback Machine URL <https://web.archive.org/web/20131217164327/http://vicostone.com/our-product/vicostone-quartz-surfaces/#! prettyPhoto>, retrieved on Aug. 9, 2022, URL<http://vicostone.com/our-product/vicostone-quartz-surfaces/>, 4 pages.

Vicostone.Com, [online] "Our Products: BQ2030 Champagne" available on or before Dec. 17, 2013, via Internet Archive: Wayback Machine URL <https://web.archive.org/web/20131217164327/http://vicostone.com/our-product/vicostone-quartz-surfaces/#!prettyPhoto[pp_gal]/32/>, retrieved on Aug. 9, 2022, URL<http://vicostone.com/our-product/vicostone-quartz-surfaces/>, 2 pages.

Vicostone.Com, [online] "Our Products: BQ9140 Nirvara" available on or before Feb. 11, 2013, via Internet Archive: Wayback Machine URL <https://web.archive.org/web/20130211010100/http://vicostone.com/our-product/vicostone-quartz-surfaces/#!prettyPhoto[pp_gal]/82/>, retrieved on Aug. 9, 2022, URL<http://vicostone.com/our-product/vicostone-quartz-surfaces/>, 2 pages.

Vicostone.com, [online] "Our Products: BQ9330 Oyster" available on or before Feb. 11, 2013, via Internet Archive: Wayback Machine URL <https://web.archive.org/web/20130211010100/http://vicostone.com/our-product/vicostone-quartz-surfaces/#!prettyPhoto[pp_gal]/50/>, retrieved on Aug. 9, 2022, URL<http://vicostone.com/our-product/vicostone-quartz-surfaces/>, 2 pages.

Vicostone.com, [online] "Our Products: BQ9418 " available on or before Dec. 17, 2013, via Internet Archive: Wayback Machine URL <https://web.archive.org/web/20131217164327/http://vicostone.com/our-product/vicostone-quartz-surfaces/#!prettyPhoto[pp_gal]/73/>, retrieved on Aug. 9, 2022, URL<http://vicostone.com/our-product/vicostone-quartz-surfaces/>, 4 pages.

Vicostone.com, [online] "Our Products: BQ9420 Tobacco" available on or before Dec. 17, 2013, via Internet Archive: Wayback Machine URL <https://web.archive.org/web/20131217164327/http://vicostone.com/our-product/vicostone-quartz-surfaces/#!prettyPhoto[pp_gal]/75/>, retrieved on Aug. 9, 2022, URL<http://vicostone.com/our-product/vicostone-quartz-surfaces/>, 4 pages.

Vicostone.com, [online] "Vicostone" available on or before Aug. 27, 2014, via Internet Archive: Wayback Machine URL <https://web.archive.org/web/20140827150813/http://vicostone.com/>, retrieved on Aug. 9, 2022, URL<http://vicostone.com/>, 2 pages.

Vicostone.com, [online] "Vicostone" available on or before Jan. 5, 2014, via Internet Archive: Wayback Machine URL <http://web.archive.org/web/20140105170841/http://vicostone.com/>, retrieved on Aug. 9, 2022, URL<http://vicostone.com/>, 2 pages.

SYNTHETIC MOLDED SLABS, AND SYSTEMS AND METHODS RELATED THERETO

CROSS-REFERENCE TO RELATED APPLICATION(S)

This is a continuation of U.S. patent application Ser. No. 16/360,665, filed on Mar. 21, 2019, which is a continuation of U.S. patent application Ser. No. 16/005,545, filed on Jun. 11, 2018 (now U.S. Pat. No. 10,300,626), which is a continuation of U.S. patent application Ser. No. 14/880,608, filed on Oct. 12, 2015 (now U.S. Pat. No. 9,993,943), which is a divisional of U.S. patent application Ser. No. 14/879,477, filed on Oct. 9, 2015 (now U.S. Pat. No. 9,993,942), which is a divisional of U.S. patent application Ser. No. 14/878,393, filed on Oct. 8, 2015 (now U.S. Pat. No. 9,718,303), which is a continuation of U.S. patent application Ser. No. 14/463,494, filed on Aug. 19, 2014 (now U.S. Pat. No. 9,186,819), the entire contents of which are incorporated herein by reference.

TECHNICAL FIELD

This document describes systems and processes for forming synthetic mold slab products, for example, a synthetic mold slab that is thermoformed or otherwise compacted to a selected slab shape from a mixture including particulate mineral material, resin binder, and pigments so that the synthetic molded slab is suitable for use in living or working spaces (e.g., along a countertop, table, floor, or the like).

BACKGROUND

Quarried stone slabs are a commonly used building material. Granite, marble, soapstone, and other quarried stones are often selected for use as countertops due to their aesthetic properties. Despite the visual appeal of quarried stone, such quarried stone slabs can be quite expensive to obtain and are generally limited to naturally occurring color schemes.

Engineered stone slabs may be formed from a man-made combination of materials that can provide improved stain-resistant or heat-resistant properties compared to quarried stone slabs. Engineered stone is typically a combination of particulate mineral material and a binder, such as a polymer resin or cement. Some engineered stone slabs, especially those of a larger slab size and having a granular formation appearance, can fall noticeably short of the complicated look and texture of quarried stone slabs.

SUMMARY

Some embodiments described herein include systems or processes for forming improved synthetic molded slabs suitable for use in living or working spaces (e.g., along a countertop, table, floor, or the like). In particular embodiments, the synthetic molded slabs can be manufactured so as to have a similar appearance to one another that, unlike quarried stone slabs taken from a quarry, is generally repeatable and predefined as part of the manufacturing process. In those embodiments, however, the appearance of each synthetic molded slab can provide complex striations or other veining patterns that emulate a quarried stone slab. For example, each slab can be formed from a combination of differently pigmented particulate mineral mixes that are vertically dispensed according to predefined pattern into a vertically oriented mold (thereby facilitating the selected striations or other veining patterns), which is then shifted to a horizontally oriented position for subsequent compression molding and curing operations. As used herein, "differently pigmented" means having different pigment combinations or otherwise having a different visual appearance in color tone or visual texture.

Particular embodiments described herein include a synthetic molded slab comprising a quartz material. Optionally, the synthetic molded slab may have a major surface at least 2 feet wide by at least 6 feet long and extending perpendicularly to a slab thickness. The major surface may at least a first pigmented vein extending generally lengthwise from edge-to-edge that separates at least two other veins extending generally lengthwise and positioned on opposing edges of the first pigmented vein. The first pigmented vein optionally has a vein thickness equal to and parallel to the slab thickness.

Some embodiments described herein include a set of separately molded synthetic slabs. Each respective slab of the set may include at least four different particulate mineral mixes distributed in the series of successive layers according to the predefined pattern for all of the separately molded synthetic slabs. The four different particulate mineral mixes may each optionally comprise a quartz material, one or more pigments, and one or more resin binders. In one preferred option, each respective slab may be rectangular and may have major surface with a width or at least 2 feet and a length of at least 6 feet. At least one of the four different particulate mineral mixes may define substantially lengthwise veins extending for a majority of the length of each respective slab such that the major surface of each respective slab in the set has similarly positioned and colored substantially lengthwise veins.

Other embodiments described herein include a process of forming a synthetic molded slab from different particulate mineral mixes. The process may include positioning a slab mold in a substantially vertical orientation. The process may also include dispensing multiple different particulate mineral mixes into the substantially vertically oriented mold so as to fill a mold space. Optionally, the mold space is at least 6 feet long by at least 2 feet wide, and the multiple different particulate mineral mixes each comprise predominantly a quartz material. The process may further include adjusting the mold to a substantially horizontal orientation while the different particulate mineral mixes are positioned in the mold. Also, the process may include contemporaneously vibrating and compacting the particulate mineral mixes arranged in the mold while the mold is in the substantially horizontal orientation.

Some embodiments of a process of forming a synthetic molded slab include pouring multiple differently pigmented particulate quartz mixes into a non-horizontally oriented mold according to a predetermined pattern. Optionally, the non-horizontally orientated mold may define an internal space having a first edge thickness that is smaller than and parallel to a second edge thickness proximate to an upwardly facing opening of the mold. The process may also include compacting the multiple differently pigmented particulate quartz mixes arranged in the mold while the mold is in the horizontal orientation.

Additional embodiments described herein include a system forming a synthetic molded slab using a combination of different particulate mineral mixes. The system may include a mold adjustment apparatus configured to reposition a slab mold from a substantially vertical orientation to a substantially horizontal orientation. Optionally, the slab mold may define a mold space that is at least 6 feet long by at least 2 feet wide. The system may also include one or more mineral aggregate distributors that are each configured to dispense a corresponding particular mineral mix vertically into the slab mold retained by the mold adjustment apparatus.

The systems and techniques described herein may provide one or more of the following advantages. First, a system can be used to produce a plurality of synthetic molded slabs that each have similar vein patterns and that are suitable for use in living or working spaces (e.g., along a countertop, table, floor, or the like). Such slabs can be formed from a combination of differently pigmented particulate mineral mixes that are vertically deposited according to predefined and repeatable dispensation pattern into a vertically oriented mold, which provides the selected veining patterns that emulate a quarried stone slab and that are generally repeatable for each slab in the plurality of separately molded slabs.

Second, each slab in the system can be formed from a series operations including at least a compression molding operation in which the mold containing the particulate mineral mixes are positioned in a horizontal orientation after the mold is filled in the vertical orientations. For example, the differently pigmented particulate mineral mixes are vertically poured into the vertically oriented mold, which is then shifted to a horizontally oriented position for a subsequent compression molding operation (e.g., vibro-compaction molding, or the like) and (in some embodiments) a curing operation. From there, some or all of the mold is removed from the hardened slab so that at least a major surface of the slab is polished to provide an appearance of the complex striations and veining patterns that emulate a quarried stone slab. In some optional embodiments, the polished major surface of each of the synthetic molded slabs provides an outer appearance that is remarkably similar to the other slabs in the set of separately molded slabs, unlike quarried stone slabs taken from a quarry. Moreover, the pigments and particulate mineral mixes can be selected to provide color combinations and visual effects that improved upon and offer a variety of color combination options far beyond what is available from quarried stone slabs taken from a quarry.

The details of one or more implementations are set forth in the accompanying drawings and the description below. Other features and advantages will be apparent from the description and drawings, and from the claims.

DETAILED DESCRIPTION

Figure 1A:
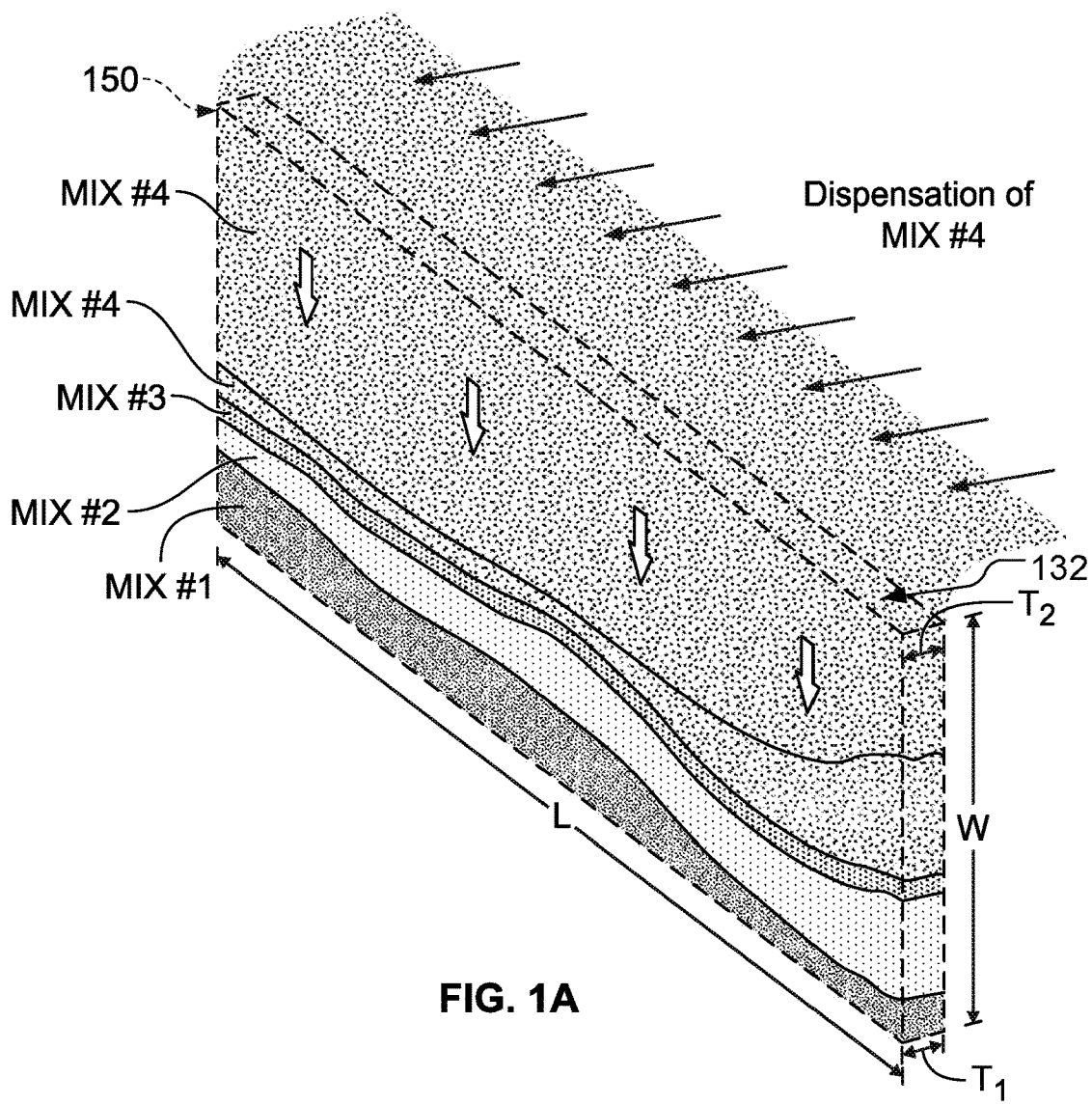
FIGS. 1A and 1B are perspective views of a synthetic molded slab during and after formation, in accordance with some embodiments.
Figure 1B:
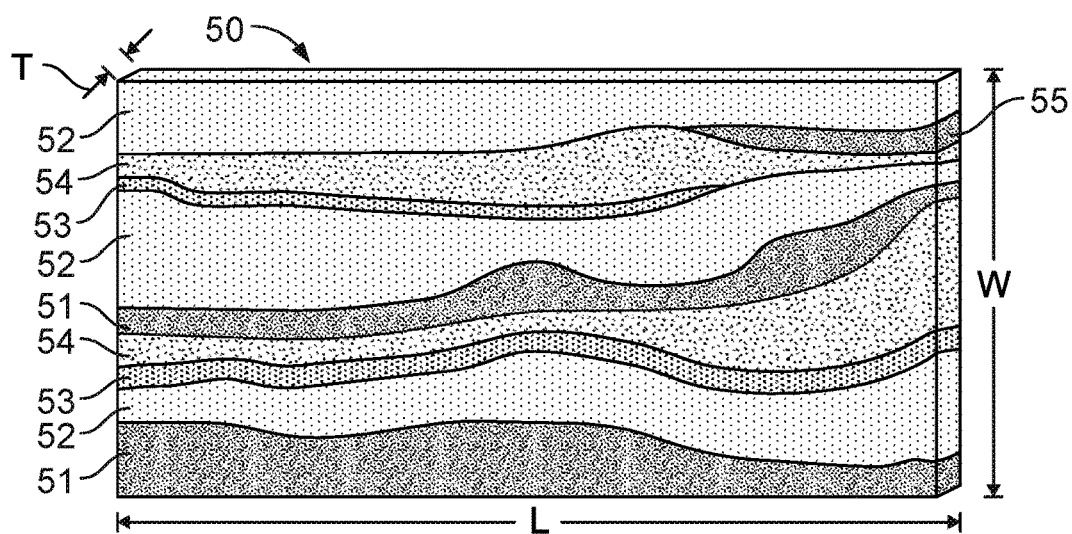

Referring to FIGS. 1A and 1B, a system can be used to produce one or more synthetic molded slabs 50 having a number of striations or veins according to a predefined pattern. Each slab 50 can comprise a quartz material and/or other particulate mineral material that, when mixed with pigments and a resin binder and subsequently compressed and cured, provides a hardened slab product suitable for use in living or working spaces (e.g., along a countertop, table, floor, or the like). As shown in FIGS. 1A-B, each slab 50 may optionally be formed from a combination of differently pigmented particulate mineral mixes that are vertically poured according to predefined and repeatable dispensation pattern into a vertically oriented mold 130 (refer to FIG. 2), which provides the selected striations or other veining patterns that are generally repeatable for each separately molded slab a slab mold is oriented vertically and filled from an open end. Successive layers of different particulate mineral mixes (e.g., different pigments, different mineral compositions, different additives, or the like) are vertically poured according to predefined and repeatable dispensation pattern into the mold until filled. The open end is closed, and the mold 130 is pivoted to a horizontal orientation (refer to the apparatus 150 in FIGS. 2-3) and then transported in the horizontal orientation for compaction, curing, and other operations. As shown in FIG. 1B, depending upon the predefined dispensation pattern of the different particular mixes, the vertical dispensation/layering process can provide a layering effect that emulates the veined appearance of quarried stone slabs such as granite or marble, including some veins 51, 52, 53, and 54 that extend fully across a complete length L of the hardened slab 50 (e.g., at least 2 feet wide by at least 6 feet long, and between about 3 feet and 5 feet wide and between about 6 feet and 14 feet long, preferably about 4.5 feet wide (more particularly, about 140 cm wide) by about 10 feet long (more particularly, about, 310 cm long)). Other veins 55 may extend only partially across the length L of the slab 50. Not only can such differently pigmented veins 51, 52, 53, and 54 extend across the full length of the slab product, but such veins 51, 52, 53, and 54 (and also partial vein 55) can also extend through the thickness of the slab 50 (thereby providing a natural vein appearance even when the slab is cut and edged to specific shapes in living or working spaces (e.g., along a countertop, table, floor, or the like). Because each slab 50 in the set of separately molded slabs can include the layers of different particulate mineral mixes dispensed vertically into the mold 130 (refer to FIG. 2) according to the predefined and repeatable dispensation pattern, multiple slabs 50 in the set of separately molded slabs can have substantially the same appearance to one another.

Figure 2:
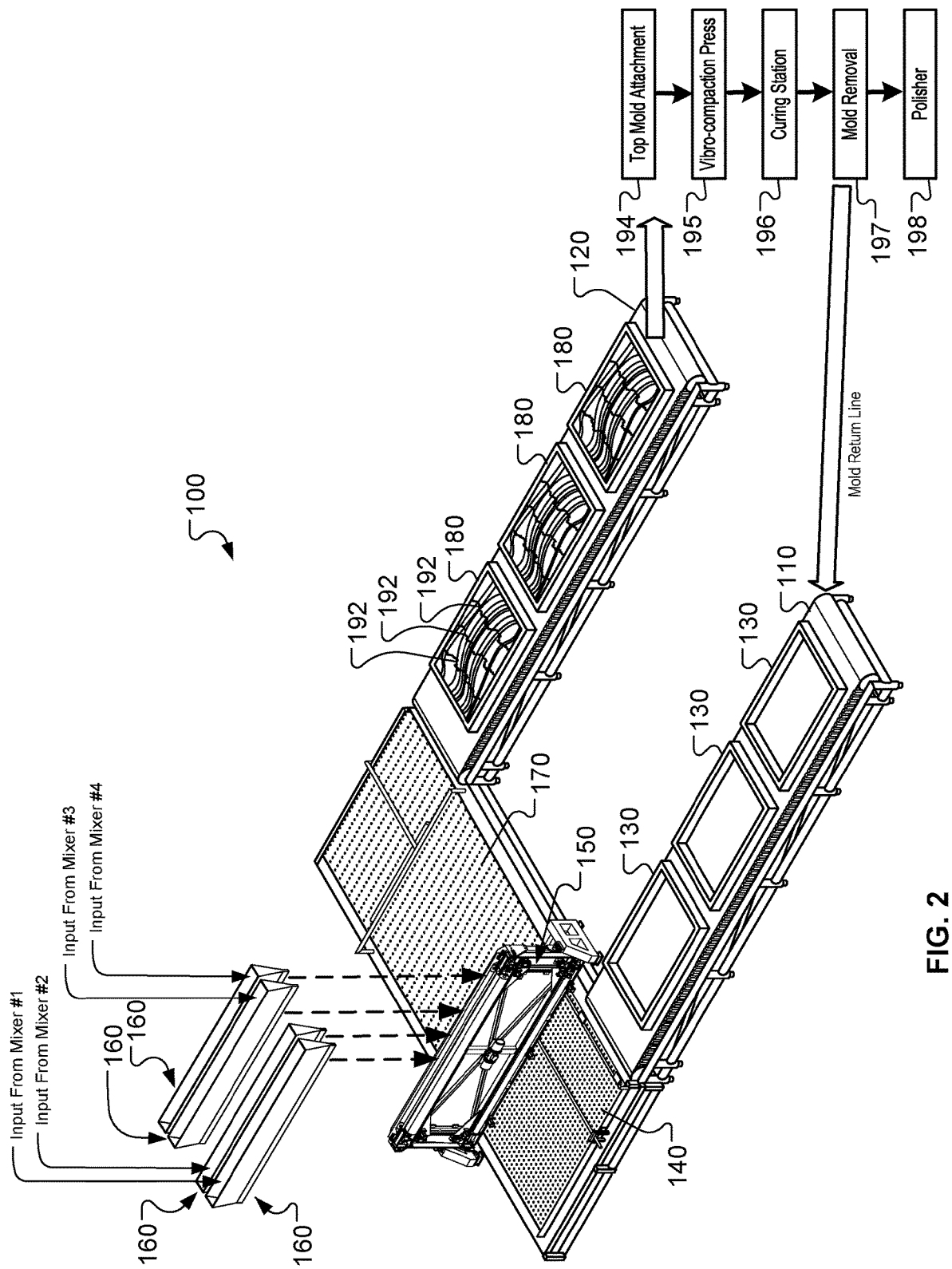
FIG. 2 is a diagram of an example system for forming a synthetic molded slab product, in accordance with some embodiments.

Referring now to FIGS. 1A-B and 2 in more detail, the mold 130 can be vertically oriented during the dispensation of the different particulate mineral mixes into the mold 130. For example, as described in more detail below, the mold 130 can include a shell portion that at least partially defines a space (shown in dashed lines in FIG. 1A) for receiving the different particulate mineral mixes via an open upwardly facing opening 132 of the mold 130. Optionally, each different particulate mineral mix is dispensed from a separate conveyor line (refer to FIGS. 2-3) that transports the respective mix to a region above the upwardly facing opening 132 so that the respective mix is then vertically poured into the mold 130. Each conveyor line may transport the respective mix according to a predefined pattern so that the different particular mixes pour into the mold a predetermined series of successive layers, some or all of which can form the veins 51, 52, 53, 54, 55 of the slab 50. Optionally, each of the successive layer of the different particulate mineral mixes can be dispensed in different amounts, thereby providing differently sized and positioned veins or striations. Furthermore, each individual layer may be differently sized at one end of the mold 130 compared to the other end of the mold 130, thereby further enhancing the complex striations and veining patterns in the hardened slab 50 so as to increasingly emulate a quarried stone slab (e.g., a traditional quarried granite slab or the like).

In this embodiment, the slab 50 comprises four different particulate mineral mixes that are separately conveyed and dispensed into the upwardly facing opening 132 of the vertically oriented mold 130. The different mixes can be compaction molded and cured in the mold (described in more detail below) so as to provide the hardened slab 50 (FIG. 1B) of composite stone material. One or more of the mixes that are used to form the composite stone material can include organic polymer(s) and inorganic (mineral) particulate component. The inorganic (mineral) particulate component may include such components as silicon, basalt, glass, diamond, rocks, pebbles, shells, a variety of quartz containing materials, such as, for example, but not limited to: crushed quartz, sand, quartz particles, and the like, or any combination thereof. In this embodiment, all four different particulate mineral mixes each comprise a quartz material as a predominant component, which may include sand of various particle sizes and of different combinations. In the hardened slab 50 (FIG. 1B), the organic and inorganic materials can be linked using a binder, which may include for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. Some or all of the mixes dispensed in the mold 130 (FIG. 1A) may include components that are combined in a mixing apparatus (not shown in FIG. 1A) prior to being conveyed to the mold 130. The mixing apparatus can be used to blend raw material (such as the quartz material, organic polymers, unsaturated polymers, and the like) at various ratios. For example, some or all of the mixes dispensed in the mold 130 may include about 8-95% quartz aggregates to about 5-15% polymer resins. In addition, various additives may be added to the raw materials in the mixing apparatus, such additives may include metallic pieces (e.g., copper flecks or the like), colorants, dyes, pigments, chemical reagents, antimicrobial substances, fungicidal agents, and the like, or any combination thereof. In alternative embodiments, some or all of the quantity of quartz aggregates (mentioned above) can be replaced with or include porcelain and/or ceramic aggregate material.

Still referring to FIGS. 1A-B and 2, the mold 130 can be vertically oriented during dispensation of the mineral particular mixes in that a major surface of the mold is positioned in a vertical position or a generally vertical position (e.g., 90 degrees from the horizontal +/−10 degrees). In such circumstances, each mineral particulate mix is vertically poured into the mold and rests on a previously deposited layer of a mineral particular mix (with the first layer being deposited instead on a closed bottom edge of the vertically oriented mold 130). Preferably, the mold 130 at least partially defines a length L and a width W of the hardened slab 50 (because the mold 130 retains the particulate mineral mixes therein throughout the subsequent compaction and curing processes). In some embodiments, the width W of the slab 50 formed in the mold 130 is at least 2 feet, between about 3 feet and 5 feet, and preferably about 4.5 feet, and the length L of the slab 50 formed in the mold 130 is at least 6 feet, and between about 6 feet and 15 feet, preferably about 10 feet. Thus, for example, the slab 50 may have a width W of 4.5 feet and a length L of 10. Alternatively, the slab 50 may have a width W of 26 inches and a length L of 10. Other slab sizes described in the above-mentioned ranges are also contemplated herein. As such, even though each slab 50 can be quite large in length L, some or all of the veins 51, 52, 53, and 54 can nevertheless extend across the full length of the slab 50. Additionally, some of the veins 51, 52, 53, and 54 that do not extend across the full length of the slab 50, at least some of those veins can optionally extend substantially across the full length of the slab 50 so that a person viewing the slab initially visualizes separated portions of the vein as being connected form a full-length vein during an initial view. Optionally, during the vertical dispensation of the mineral particular mixes into the mold 130, the mold 130 may have a thickness $T_1$ at its lower edge that is different from the thickness $T_2$ at its upper opening 132. For example, the thickness $T_2$ may be about twice the thickness $T_1$. The different thicknesses $T_1$ and $T_2$ may be used to account for the additional compaction of the particulate mineral mixes that occurs near the lower edge of the slab as additional layers of the particulate mineral mixes are deposited into the mold 130. After the mold 130 is rotated to a horizontal orientation for subsequent compaction and curing of the slab 50, the mixture is more evenly compacted together and the mold 130 defines a generally continuous thickness T (FIG. 1B) of the slab 50. In some embodiments, the thickness T of the slab 50 formed in the mold 130 is at least 0.2 cm, between about 0.2 cm and 5 cm, and preferably about 3 cm. Each mold 130 may be formed of structure that comprises a flexible polymer (including an elastomeric material), paper, wood, metal or a combination thereof.

Referring now to FIG. 2, in some embodiments, a system 100 for forming a set of synthetic molded slab products (e.g., the slab 50 in FIG. 1B, the slab 600 in FIG. 7, or the like) is configured to vertically pour differently pigmented particulate mineral mixes into a vertically oriented mold, which is then shifted to a horizontally oriented position for a subsequent compression molding operation (e.g., vibrocompaction molding, curing, etc.). The system 100 in the depicted embodiment includes an input conveyor 110 and an output conveyor 120. A collection of slab molds 130 are transported on the input conveyor 110. The slab molds 130 provide a form for synthetic molded slab products that are at least three feet wide and at least six feet long, and about 4.5 feet wide by about 10 feet long in some embodiments depicted herein. The input conveyor 110 transports the slab molds 130 to a mold positioning table 140, which is configured to help operators move and/or orient the slab molds 130.

In this embodiment, the slab molds 130 are moved horizontally (e.g., relative to gravity) onto an apparatus 150 for pivoting each mold 130 between a vertical orientation and a horizontal orientation. The apparatus 150 in this embodiment serves as a tip table 150, which is configured to accept one or more of the slab molds 130, secure it, and pivot the slab mold 130 from the horizontal orientation to the vertical orientation (described above) with an open edge (numeral 132 in FIG. 1A) positioned at the top of the slab mold 130 when in the vertical orientation. For example, in this embodiment, the tip table 150 is configured to receive and releasably retain one mold 130 at a time. Additional details of this particular embodiment of the tip table 150 are described further in connection with FIGS. 4A-6C. In alternative embodiments, the tip table 150 can be configured to receive and releasably retain multiple molds 130 at a time.

Still referring to FIG. 2, in this embodiment, the mold 130 vertically oriented in the apparatus 150 is configured to receive four differently pigmented mineral mixes (comprising mostly a quartz material as described above), which can be conveyed from four corresponding mixers and directed to inputs 160 such as dispenser heads or other material transport structures. In this embodiment, each dispenser head 160 is configured to release a different particulate mineral mix (e.g., different pigments, different mineral compositions, different additives, or a combination thereof) compared to the other dispenser heads 160. Each dispenser head 160 is configured to controllably dispense its supply of corresponding particulate mineral mix for input into the vertically oriented mold 130 retained by the tip table 150. For example, the dispensing heads 160 are each configured with a shutter or valve apparatus (not shown) that is controllable to regulate the flow of particulate mineral mix from the dispensing head 160 for input to the mold 130. In such embodiments, the dispensing heads (or other inputs for distributing the particulate mineral mixes to the mold 130) can be controlled according to a predetermined control algorithm so as to define successive layers of the differently pigmented particulate mineral mixes for vertical dispensation into the slab mold 130 retained by the tip table 150.

When the tipping table 150 retains a mold 130 in the vertical orientation, the upwardly facing opening 132 (FIG. 1A) of the mold 130 is positioned below (e.g., relative to gravity) the outputs of the mineral aggregate distributors 160. As such, the particulate mineral mixes that are dispensed from the outputs of the distributors 160 and then through the upwardly facing opening 132 (FIG. 1A) of the mold 130. As such, the distributors 160 (each carrying a different particulate mineral mix according to a pattern dispensed by its corresponding dispensing head) can be used to pour the respective mix into the vertically oriented mold 130 to provide a predetermined series of successive layers (which are repeatable for each mold 130 in the line). As previously described, some or all of these successive layers of different particulate mineral mixes can form the lengthwise veins of the hardened slab (e.g., the slab 50 in FIG. 1B, the slab 600 in FIG. 7, or the like).

In the illustrated example, four mineral aggregate inputs 160 are used, although in other examples, the slab may be formed from between 1 and 20 different particulate mineral mixes, and more preferably between 3 and 8 different particulate mineral mixes (which, in some embodiments, would provide a system that would include a corresponding number of inputs 160). In some examples, the number of mineral aggregate distributors 160 can correspond equally to the number of differently pigmented particulate mineral mixes used to create the hardened slab product.

After the slab mold 130 retained by the tipping table 150 has been sufficiently filled (while in the vertically oriented orientation), the tip table 150 pivots or otherwise adjusts the slab mold 130 to a horizontal orientation. The slab mold 130 (now a filled mold 180) is moved out of the tip table 150, on a cushion of air provided by another mold positioning table 170, to an output conveyor 120. As shown in FIG. 2, the successive layers of different particulate mineral mixes that were vertically dispensed into the mold 130 are generally noticeable in the filled molds 180 are arranged in the horizontal orientation on the output conveyor 120. Some or all of these successive layers of different particulate mineral mixes can form the lengthwise veins of the hardened slab (e.g., the slab 50 in FIG. 1B, the slab 600 in FIG. 7, or the like).

Optionally, the system 100 may be configured to provide one more generally "widthwise" or transverse veins 192 (as compared to the generally "lengthwise" veins 51, 52, 53, and 54 (FIG. 1B) defined by the successive layers of different particulate mineral mixes previously poured into the mold 130 while at the tip table 150). Optionally, these widthwise veins 192 may be thinner and spread further apart than the generally "lengthwise" veins defined by the successive layers of different particulate mineral mixes. Also, these widthwise veins 192 may be formed from a material having a different pigmentation than the particulate mineral mixes dispensed from the inputs 160. For example, the system can be configured to controllably dispense the particulate mineral mix for the widthwise veins 192 in a selected location or pattern for each mold before the mold is advanced to a top mold attachment operation 194 or a vibro-compaction press 195 (FIG. 2), thereby providing a predetermined pattern of the widthwise veins 192 that is repeatable for each of the filled molds. In some optional circumstances, the widthwise veins 192 may not extend through the full thickness of the hardened slab (which can be different from some or all of the generally lengthwise veins 51, 52, 53, and 54 (FIG. 1B)).

Still referring to FIG. 2, the output conveyor 120 can be configured to transport each of the filled molds 180 to one or more sequent stations in the system 100 for forming the hardened slab. For example, each of the filled molds 180 can continue to a subsequent station in which a top mold attachment 194 is positioned over the filled mold 180 so as to encase the layers of particular mineral mixes between the mold 130 and a top cover mold piece (not shown in FIG. 2). From there, the filled mold 180 (now including the top cover mold piece continues to a subsequent station in which a vibro-compaction press 195 applies compaction pressure, vibration, and vacuum to the contents inside the filled mold 180, thereby converting the particulate mixes into a rigid slab. After the vibro-compaction operation, the filled mold 180 (with the compacted and hardened slab therein) proceeds to a curing station 196 in which the material used to form the slab (including any resin binder material) are cured via a heating process or other curing process, thereby further strengthening the slab inside the filled mold 180. After the slab is fully cured (and, optionally, after the slab is cooled), the primary mold 130 and the top mold cover piece are removed from the hardened and cured slab at a mold removal station 197. The primary mold 130 is then returned to the input conveyor 110 (FIG. 2). Then, in some embodiments, the hardened and cured slab is moved to a polisher station 198, in which a major surface of the slab is polished to a smooth finish, thereby an appearance of the complex striations and veining patterns that emulate a quarried stone slab. Alternatively, the polisher station 198 is not implemented so that the resulting slab has a more textured major surface rather than a smooth, polished surface. In some embodiments of the system 100, the polished or otherwise exposed major surface of each of the synthetic molded slabs can provide an outer appearance that is substantially repeatable for the other slabs (from the other filled molds 180 in FIG. 2).

Figure 3:
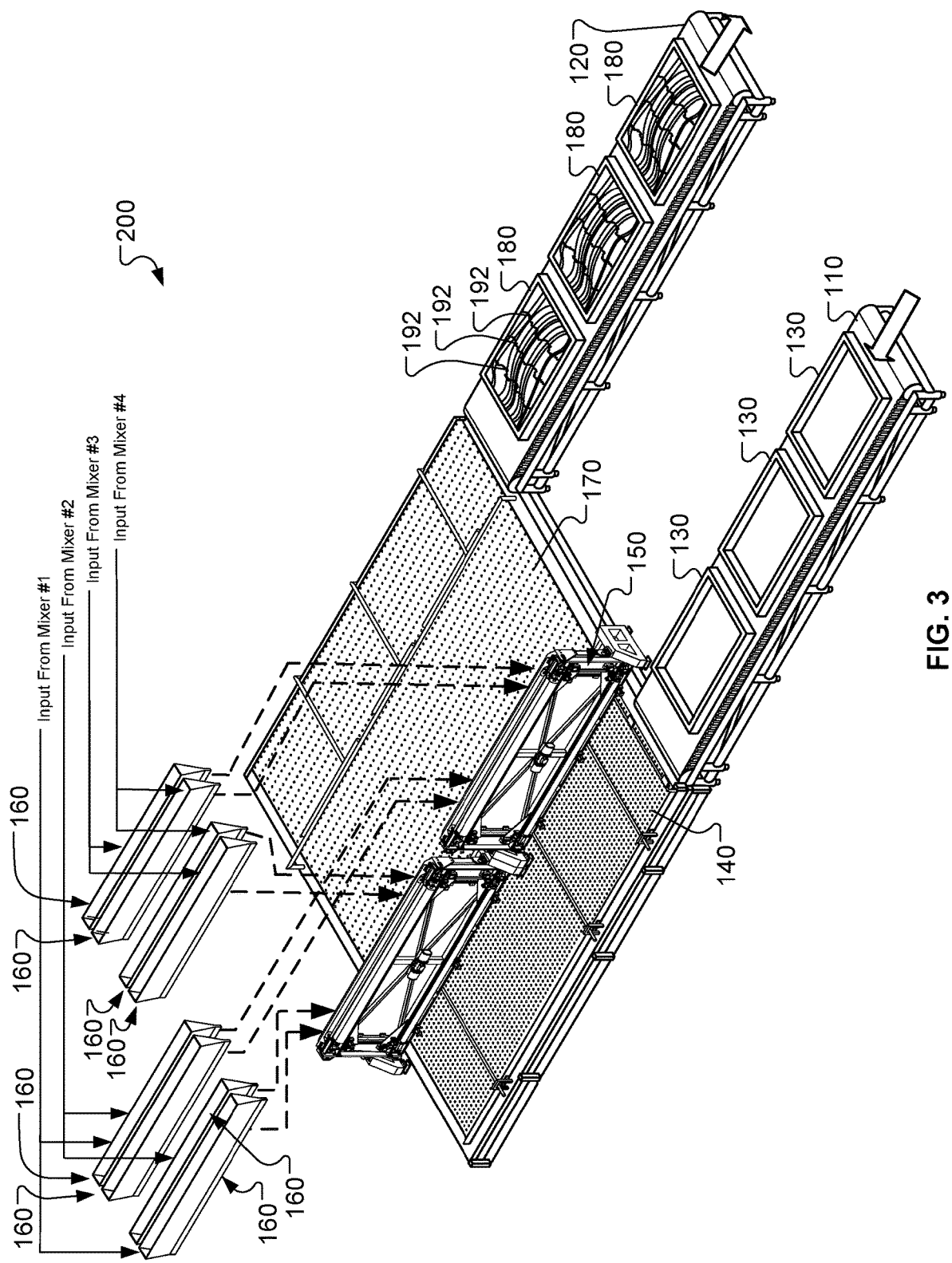
FIG. 3 is a diagram of another example system for forming a synthetic molded slab product, in accordance with other embodiments.

Referring now to FIG. 3, another example system 200 for forming a synthetic molded slab product can be configured to contemporaneously fill multiple vertically oriented molds 130, thereby increasing the production rate in some circumstances. The system 200 is substantially similar in layout and operation to the system 100 (FIG. 2), having the input conveyor 110, the output conveyor 120, the mold positioning tables 140 and 170, the slab molds 130, and the filled molds 180. The system 200, however, includes eight of the mineral aggregate inputs 160, with four inputs 160 arranged to feed four different particulate mineral mixes into a first vertically oriented mold 130 secured to the tip table 150, and another set of four inputs 160 arranged to feed the four different particulate mineral mixes into a second vertically oriented mold 130 secured to a second tip table 150 (not visible in FIG. 3).

Accordingly, the operation of the system 200 is substantially similar to that of the system 100 (FIG. 2), except that multiple molds 130 are substantially vertically oriented and contemporaneously filled before being adjusted to horizontal orientations and moved to the output conveyor 120 as filled molds 180. As shown in FIG. 3, the filled molds 180 that were simultaneously filled (in this embodiment, using the two adjacent tip tables 150) can have substantially the same appearance of veins defined by the successive layers of different particulate mineral mixes poured into each of the molds according to a predetermined pattern.

Figure 4A:
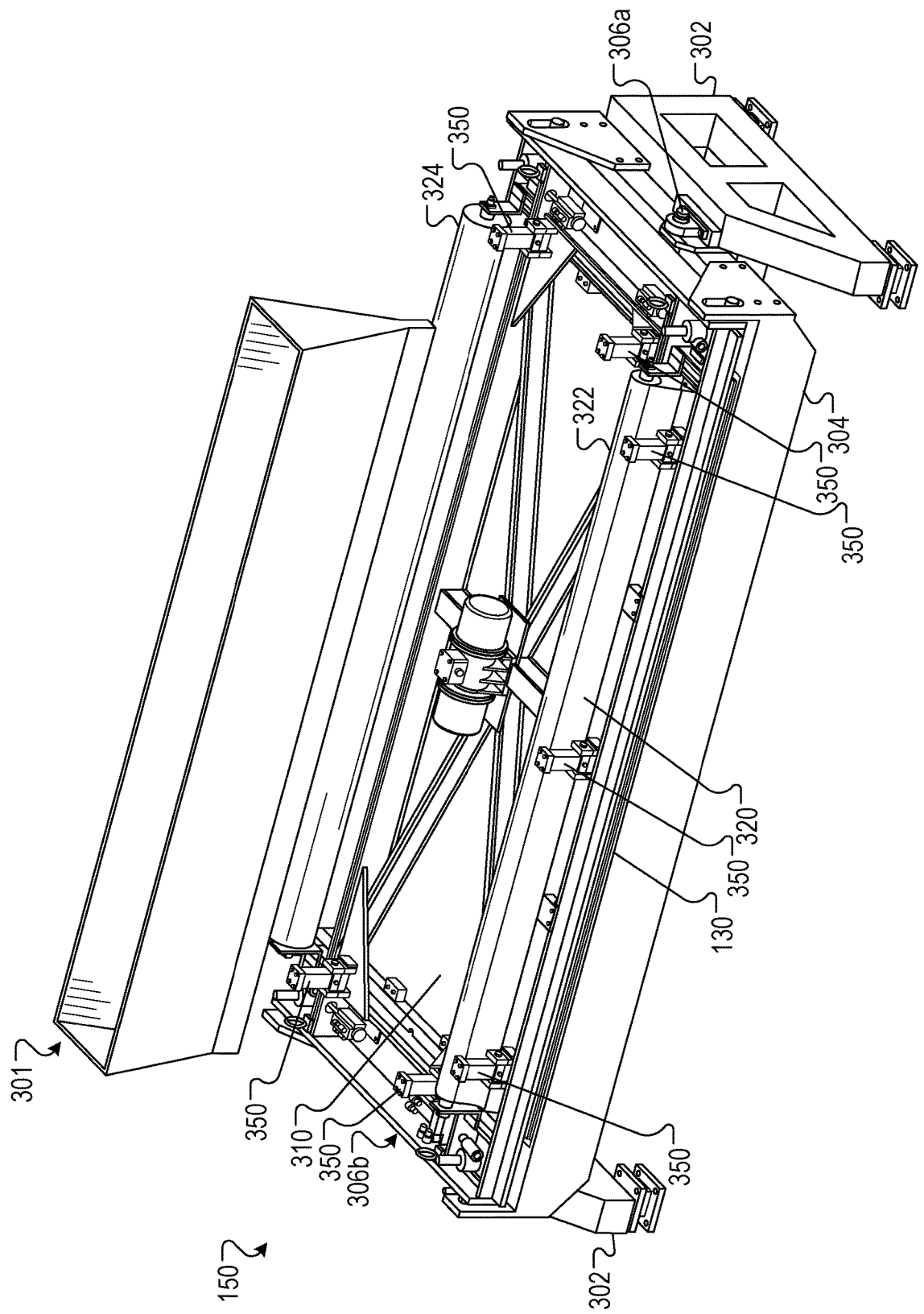
FIGS. 4A and 4B are perspective and cross-sectional views of a slab mold adjustment apparatus of FIGS. 2 and 3 in a horizontal configuration.
Figure 4B:
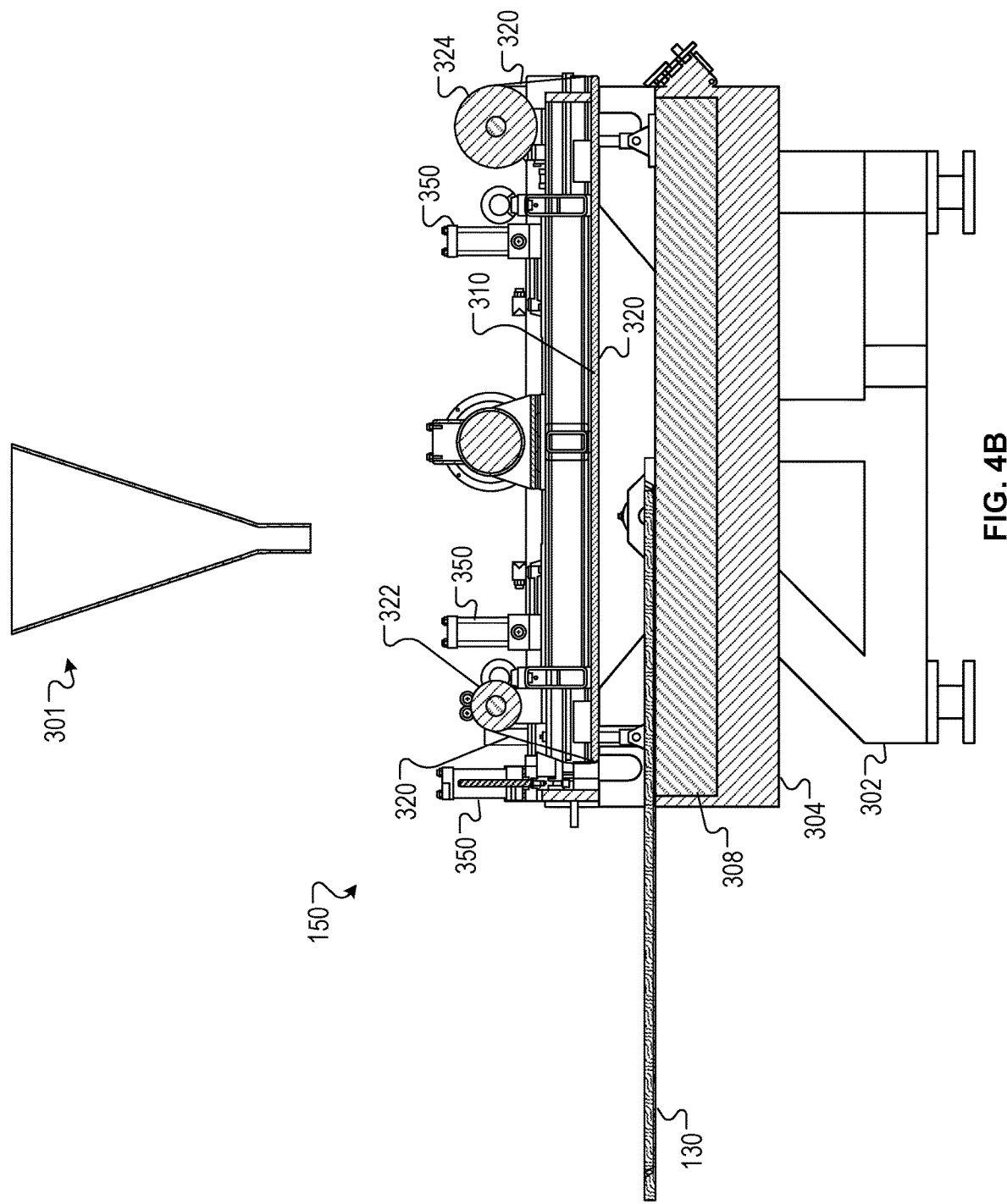

Referring now to FIGS. 4A and 4B, each tip table 150 in the system 100 or 200 can be configured to receive the mold 130 in a horizontal orientation. The tip table 150 is located vertically below a fill chute 301, with respect to gravity. In the systems 100 and 200 (FIGS. 2 and 3, respectively), the chute 301 is positioned vertically below the gap(s) 166 at the end of the belts 164, e.g., to direct fill from the mineral aggregate distributor 160 into the slab mold 130. The tip table 150 includes a collection of supports 302 and a table base 304 connected by a pivot point 306a and a pivot point 306b (not visible). The supports 302 provide support to elevate the table base 302 above a floor, and the pivot points 306a-306b provide a bearing upon which the table base 302 can tilt relative to the supports 302.

As previously described, the mold positioning table 308 provides a mechanism (e.g., rollers, conveyors, actuator arms, etc.) to move the slab mold into the tip table 150 between the table base 302 and a top plate 310 (e.g., while the tip table is in a horizontal configuration). Optionally, a film 320 extends across the surface of the top plate 310, between the top plate 310 and the slab mold 130. The film 320 is fed from a feeder roll 322 and is collected by a takeup roll 324. In use, the optional film provides a protective barrier between the top plate 310 and filler material deposited into the mold (e.g., to maintain the cleanliness of the top plate 310 during repeated use with a series of molds 130). Predetermined lengths of the film 320 can be used once per mold filling operation, or for multiple mold filling operations before being advanced to the takeup roll 324 and a fresh length of the film 320 is provided from the feeder roll 322. A collection of actuators 350 controllably position the top plate 310 apart from the table base 302 and the slab mold 130.

Figure 5:
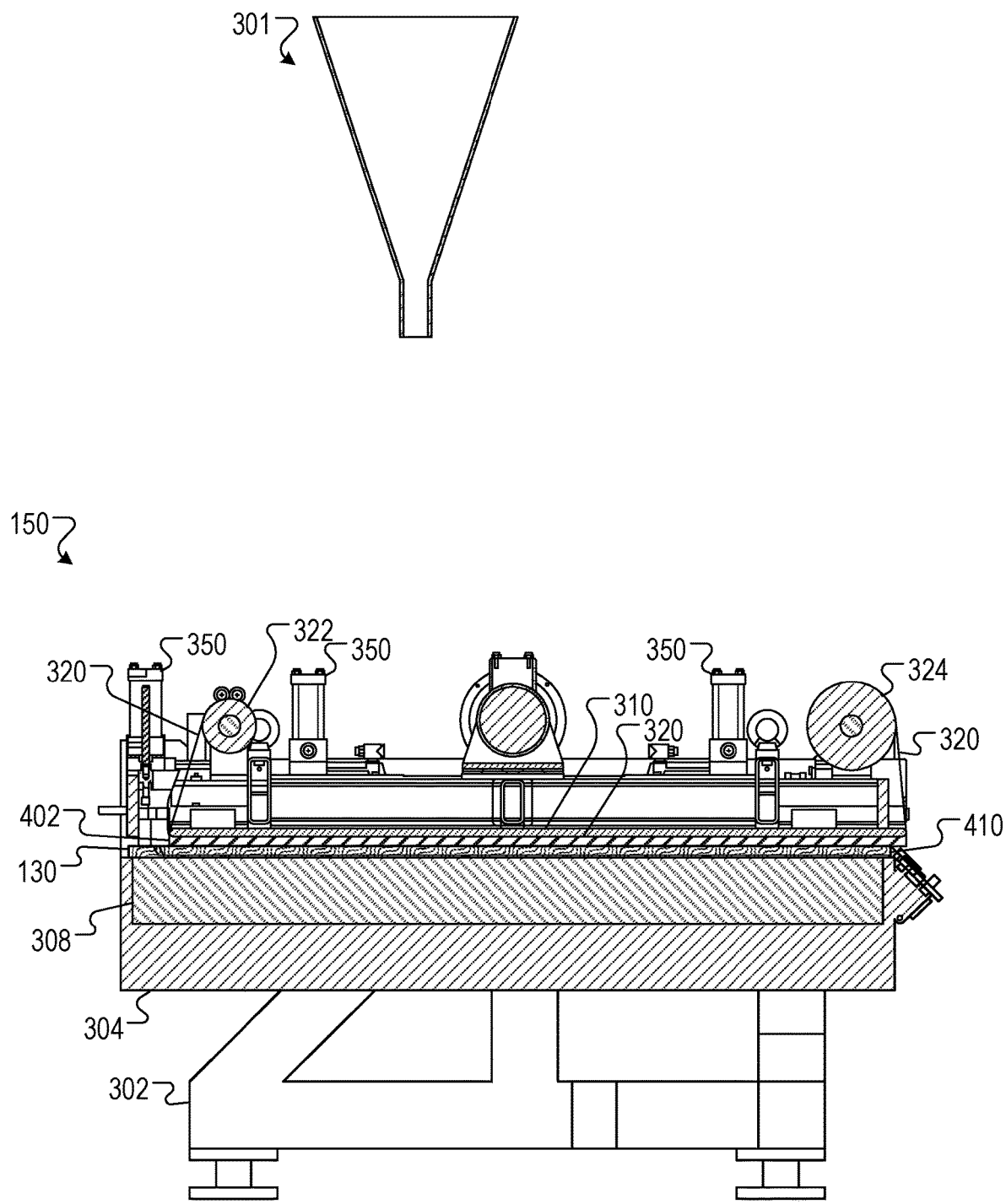
FIG. 5 is another cross-sectional view of the slab mold adjustment apparatus of FIGS. 4A and 4B.

FIG. 5 is another cross-sectional view of the tip table 150 of FIGS. 1-3B. In the illustrated view, the slab mold 130 is positioned in a horizontal orientation within the tip table 150. The collection of actuators 350 are actuated to bring a mold gasket 402 into contact with the outer periphery of the slab mold 130. The collection of actuators 350 are actuated to move the top plate 310 toward the slab mold 130, compressing the mold gasket 402 between the slab mold 130 and the top plate 310. Optionally, the combination of the mold gasket 402 and the slab mold 130 includes a slight asymmetry in the form of a trapezoidal cuboid (e.g., refer to $T_1$ and $T_2$ described in connection with FIG. 1A). In the configuration shown in FIG. 4, the slab mold provides three edges and a one major face of a six-sided trapezoidal cuboid form, and the film 320 and the top plate 310 form another major face. An open end 410 of the slab mold 130 forms the sixth side (e.g., the fourth edge) of the trapezoidal cuboid form. In this embodiment, the major faces are oriented at a slight angle so as to be non-coplanar, with the cuboid having a relatively greater thickness ($T_2$ from FIG. 1A) along the openable end 410 and a thickness ($T_1$ from FIG. 1A) along the opposing edge that is less than the thickness along the openable end 410. With the tip table 150 in the configuration shown in FIG. 5, the slab mold 130 is ready to be repositioned to a vertical orientation for filling.

Figure 6A:
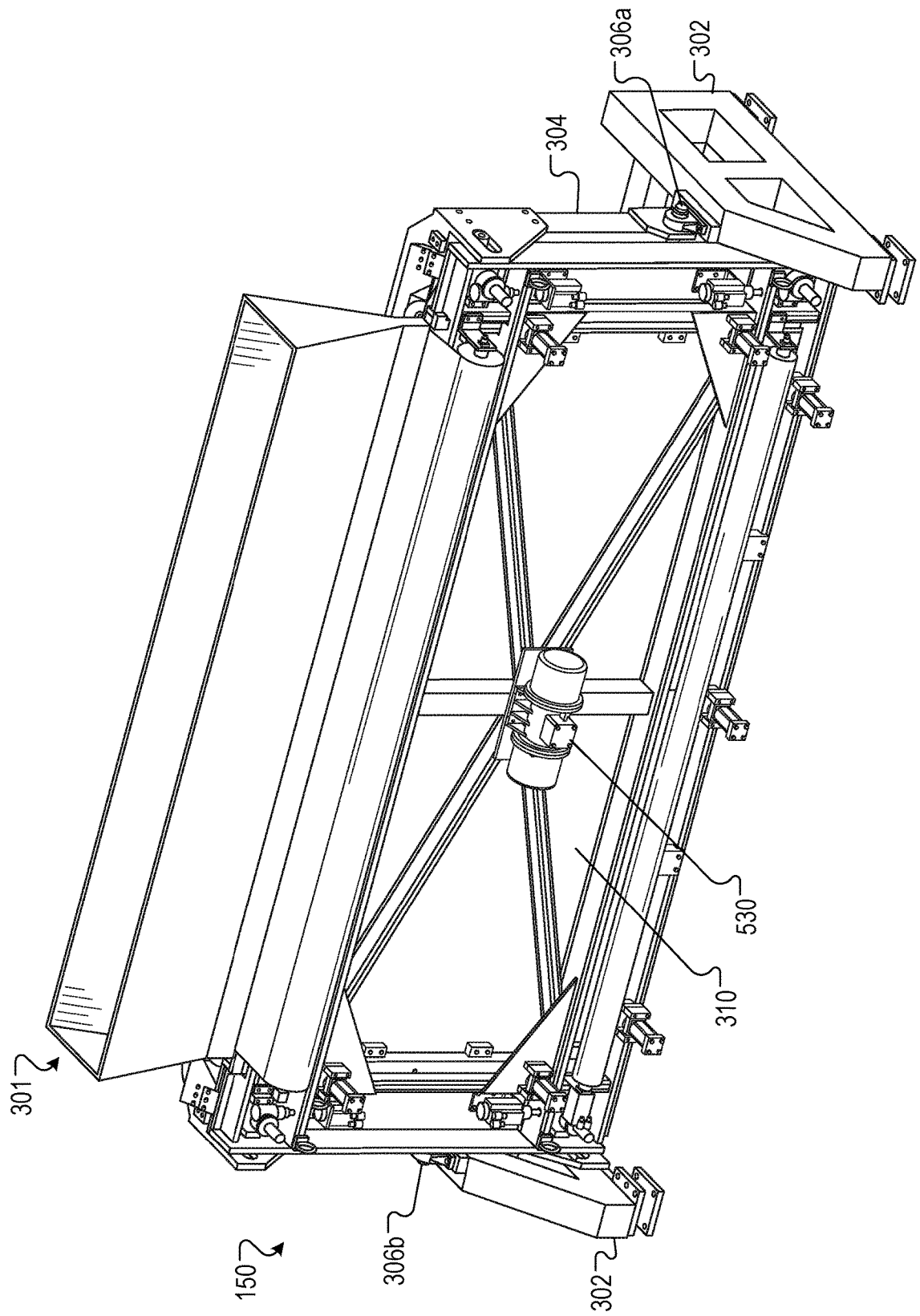
FIGS. 6A-6C are perspective and cross-sectional views of the slab mold adjustment apparatus of FIGS. 4A and 4B in a vertical configuration.
Figure 6B:
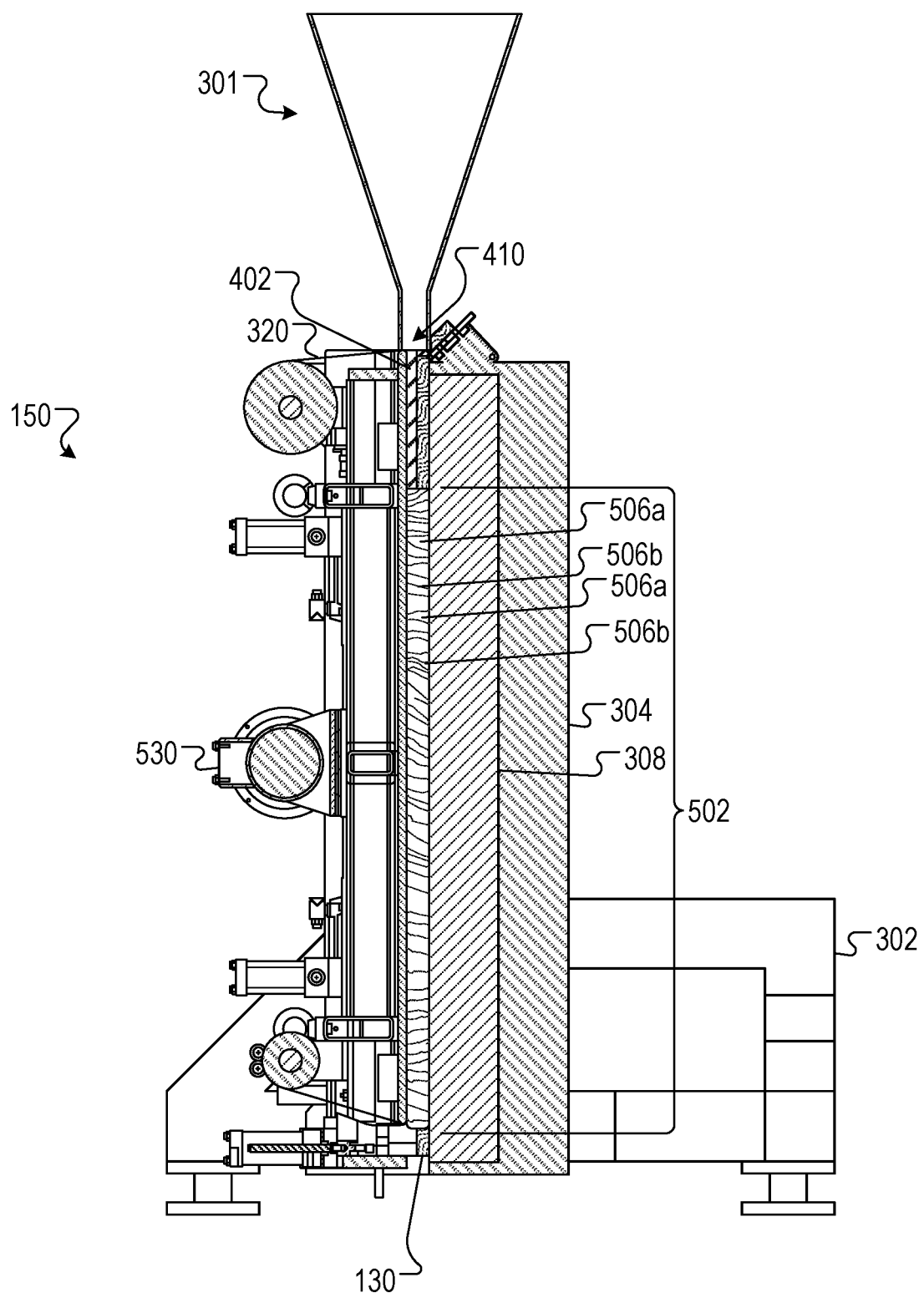
Figure 6C:
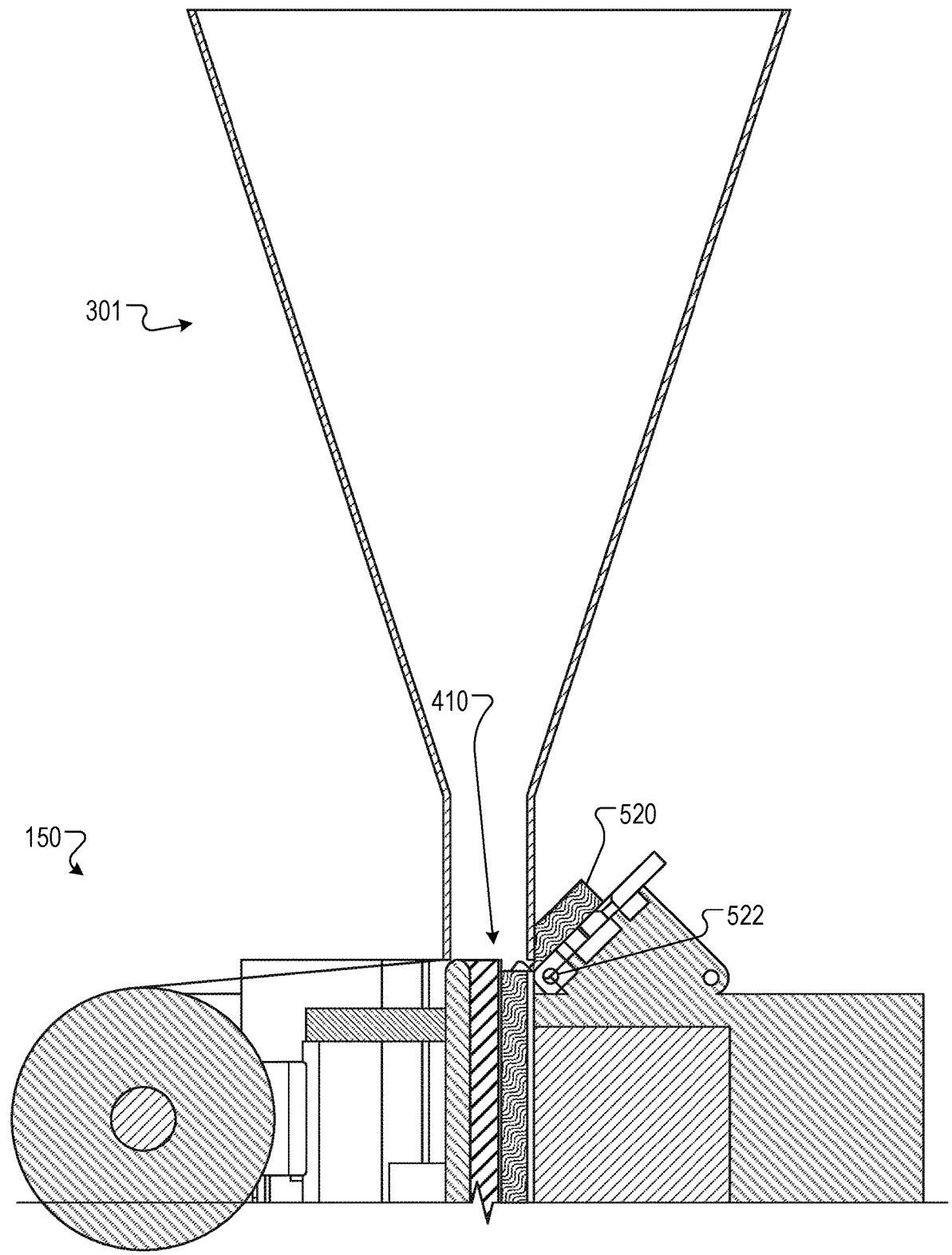

Referring now to FIGS. 6A-6C, the tip table 150 of FIGS. 1-5 can adjust the slab mold 130 to the vertical orientation by pivoting about pivot points 306a-b. In particular, the slab mold 130 is oriented to the vertical position by pivoting the table base 304, the mold positioning table 308, the top plate 310, the mold gasket 402, and the film 320, on the pivot points 306a-306b relative to the supports 302. As shown in FIG. 6B, in the illustrated example, the slab mold 130 is partly filled with successive layers of different particulate mineral mixes 502 (e.g., partially through the mold filling process; refer also to FIG. 1A for another example). As discussed in the descriptions of FIGS. 2 and 3, the different particulate mineral mixes are controllably released via the inputs 160s and poured (under the force of gravity in this embodiment) into the chute 301, through the open end 410, and into the slab mold 130. The different particulate mineral mixes 502 includes multiple, variously designed and selected mixes (including predominantly a quartz material in this embodiment) vertically poured into the mold 130 in successive layers, which can create different vein layers 506a-506b. As previously described in connection with FIGS. 1A and 1B, some or all of the vein layers 506a-506b can extend substantially from edge to edge and across the length L of the slab mold 130.

As discussed previously, the slab mold 130 in this embodiment provides a trapezoidal cuboid form. In the illustrated vertical orientation, the asymmetry of the slab mold 130 occurs from top to bottom, forming a very slight "V" shape (e.g., refer also to the description of $T_1$ and $T_2$ described in connection with FIG. 1A). In some embodiments, the asymmetry can be selected to at least partly offset the effects of gravity on the slight compaction of the different particulate mineral mixes 502 at the lower edge of the mold 130 as the mixes fill the slab mold 130. Optionally, a vibrator 530 vibrates and/or shakes the slab mold 130 and the particulate mineral mixes 502 to promote a complete filling of the mold 130. Once the slab mold 130 is sufficiently filled with the particulate mineral mixes 502 according to the predefined pattern from the distributors 160 (FIGS. 2 and 3), the slab mold 130 becomes the filled mold 180 (refer to FIGS. 2 and 3).

Referring now to FIG. 6C, an enlarged view of the chute 301 and the open end 410 (refer also to the upwardly facing opening 132 in FIG. 1A) of the slab mold 130. In this embodiment, the open end 410 includes a mold end cap 520, and the mold end cap 520 is movable about a pivot point 522 to selectably open and close the openable end 410. When the slab mold 130 is sufficiently filled with the filler 502, the mold end cap 520 is pivoted to the closed position to provide the sixth side of the cuboid form (e.g., to close the open edge of the filled mold. The tip table 150 then adjusts the filled mold from the vertical orientation (FIGS. 6A-6C) to the horizontal orientation (refer to FIGS. 4A-5). The actuators 350 can be activated to release the filled mold 180 from the tip table 150, and the filled mold 180 can be moved out of the tip table 150 and onto the output conveyor 120 (FIGS. 2 and 3).

Figure 7:
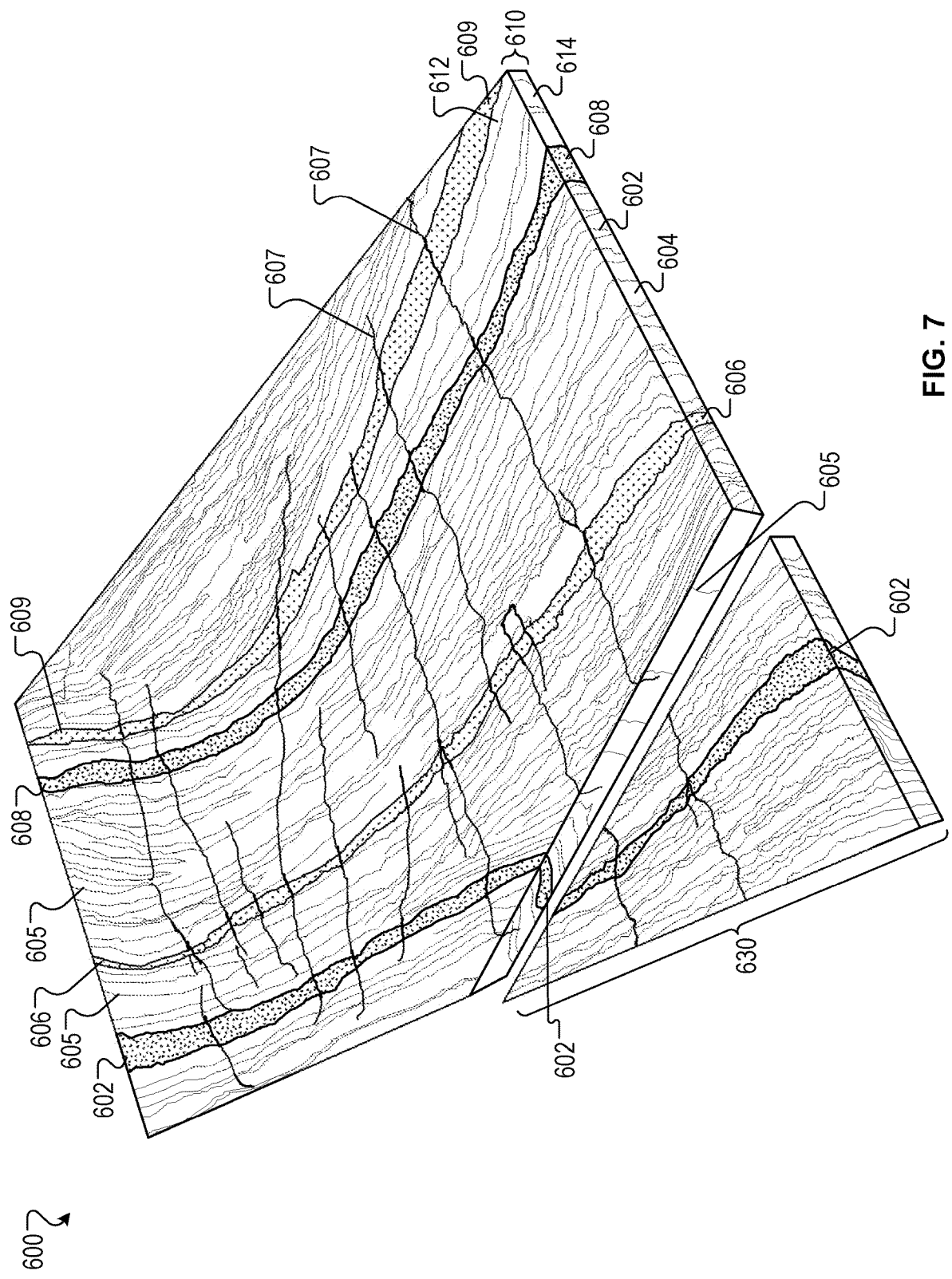
FIG. 7 is a perspective view of an example synthetic molded slab product formed by either of the systems of FIGS. 2 and 3.

Referring now to FIG. 7, an example synthetic molded slab product 600 can be formed by either of the systems of FIGS. 2 and 3 using a combination of differently pigmented particulate mineral mixes that are vertically poured according to predefined pattern into the mold 130. In some embodiments, the synthetic molded slab product 600 can provide a veined appearance that emulates quarried stone slabs such as granite or marble, depending upon the predefined dispensation pattern of the different particular mixes. For example, the major surface 612 of the slab 600 can be polished and provide at least some veins 602, 606, and 608 that extend fully across a complete length of the hardened slab 600 (which may be about 6 feet to about 14 feet long, and preferably about 10 feet long in this embodiment). Other veins 605 and 609 may extend only partially across the length of the slab 50, and some veins 605 have much smaller size (although perhaps a much darker hue). Not only can such differently pigmented veins (602, 605, and 605, for example) extend across the full length of the slab product, but such veins can also extend through the thickness 610 of the slab 600 from the first major face 612 to the opposing major face 614 (thereby providing a natural vein appearance even when the slab is cut and edged to specific shapes in living or working spaces (e.g., along a countertop, table, floor, or the like). Additionally, at least the major surface 612 of the slab 600 may include a plurality of veins 607 that are oriented in a transverse direction relative to the veins 602, 605, 606, 608 and 609. Such veins may be defined, for example, by the secondary dispenser 190 (refer to FIGS. 2 and 3). Some of these "widthwise" veins 607 can extend fully across a complete width of the hardened slab 600 (which may be about 2 feet and about 6 feet wide, and preferably about 4.5 feet wide in this embodiment). Because each slab 600 in the set of separately molded slabs (refer, for example, to the system in FIGS. 2 and 3) can include the layers of different particulate mineral mixes dispensed vertically into the mold 130 according to the predefined and repeatable dispensation pattern, multiple slabs 600 in the set can have similarly positioned veins in the major surface and can provide substantially the same appearance to one another.

The synthetic molded slab 600 can be cut, milled, machined, or otherwise processed to various shapes and sized (e.g., to provide custom-fit countertop surfaces with optional holes for sinks, faucets, or other amenities). For example, a section 630 is cut away from the synthetic molded slab product 600. With the veins 602 and 605 extending into the interior 606 and/or across the thickness 610, cutting and/or processing of the synthetic molded slab product 600 shows the veins 602, 605, 606, 608 and 609 in a manner that emulates the aesthetics of quarried stone slabs.

Figure 8:
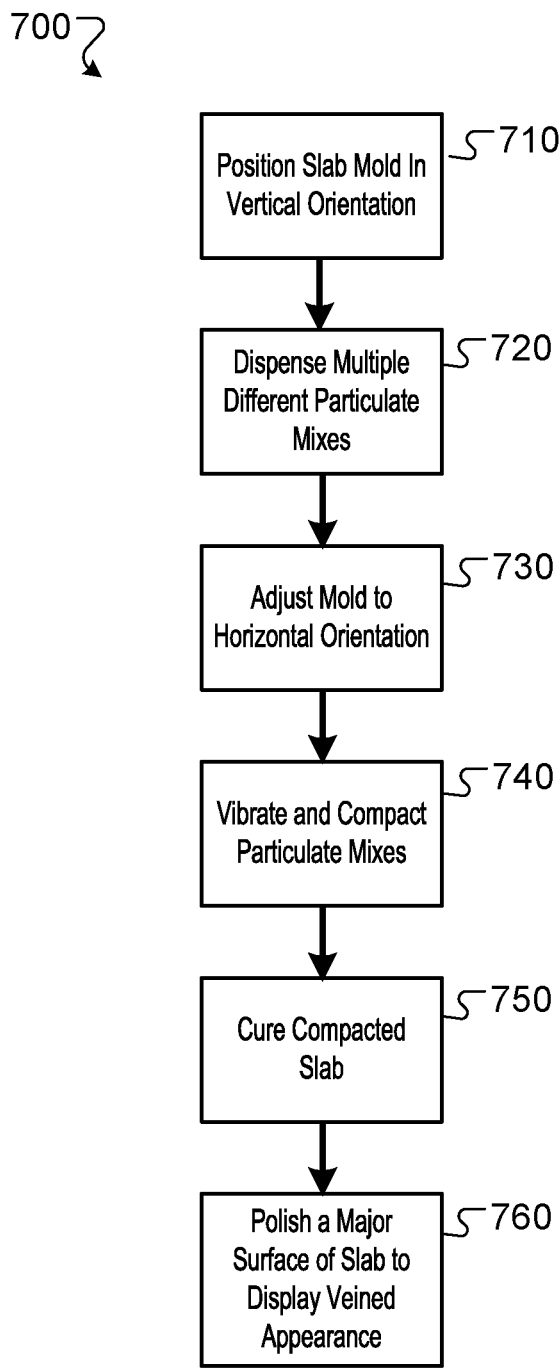
FIG. 8 is a flow diagram of an example process for forming a synthetic molded slab product.

FIG. 8 is a flow diagram of an example process 700 for forming a synthetic molded slab product (such as slab 50 or 600 described above). In some implementations, the systems 100 or 200 of FIGS. 2 and 3 can be used to perform the process 700. The process 700 may include the operation 710 of positioning a slab mold in a non-horizontal orientation, such as a substantially vertical orientation or another orientation that extends transverse to the horizontal. In such an operation, a major face of the mold (which will define a major face of the slab product) can be positioned in a substantially vertical position (about 90 degrees from the horizontal +/−30 degrees (preferably +/−10 degrees)), for example, by a tip table or another mold adjustment apparatus. In some embodiments depicted above herein, the major face of the mold (which will define a major face of the slab product) can be positioned in a vertically oriented position (about 90 degrees from the horizontal +/−10 degrees) by the tip table 150 (FIGS. 2 and 3). The process 700 may also include the operation 720 of dispensing multiple different particulate mineral mixes into the vertically oriented mold. For example, as previously described, differently pigmented mixes comprising predominantly a quartz material (e.g., a mix including the particulate quartz material, one or more pigments, and one or more resin bonders) can be fed into a vertical pour operation using one of the distributors 160 (FIGS. 2 and 3). Next, the process 700 may include the operation 730 of adjusting the mold to a horizontal orientation while the different particulate mineral mixes are positioned in the mold. Again, such an operation can be performed, for example, by the tip table 150 (FIGS. 2 and 3) or another mold adjustment apparatus. The process 700 may further include the operation 740 of contemporaneously vibrating and compacting the particulate mineral mixes arranged in the mold while the mold is in the horizontal orientation. In such circumstances, the operation 740 may provide a compacted slab of composite stone material. Also, in some embodiments, the process 700 may further include the operation 750 of curing the compacted slab. The process 700 may also include the operation 760 of polishing a major surface of the slab to provide a veined appearance on the polished surface of the slab, including but not limited to the examples described above.

Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A processed slab formed from a plurality of particulate mineral mixes deposited into a mold, comprising:
   a slab width that is at least 2 feet, a slab length that extends perpendicular to the slab width and that is at least 6 feet, and a slab thickness that extends perpendicular to the slab width and the slab length, the slab length greater than the slab width, the slab width greater than the slab thickness;
   a set of slab veins exposed along both a front major surface of the slab and a rear major surface of the slab parallel with the front major surface of the slab, the set of slab veins defined by a plurality of deposited layers of particulate mineral mixes and comprising at least first, second, and third veins:
   the first vein defined by a first particulate mineral mix that extends across the slab length, the first vein having a first vein length that is greater than the slab width, the first vein bowed in a first direction toward a first long edge of the major surface and away from an opposing long edge of the major surface along at least a portion of the first vein length, the first particulate mineral mix including a quartz material, a pigment, and a binder, and; and the second vein defined by a second particulate mineral mix, the second particulate mineral mix different than the first particulate mineral mix and including a quartz material, a pigment, and a binder, the second vein extending across the entire slab length between opposing short edges of the major surface, the second vein having a second vein length that is greater than the slab width, the second vein bowed in the first direction toward the first long edge of the major surface and away from the opposing long edge of the major surface along at least a portion of the second vein length.

2. The processed slab of claim 1, wherein the front major surface is polished.

3. The processed slab of claim 1, wherein the second and third veins are positioned on opposing sides of the first vein.

4. The processed slab of claim 1, wherein the first vein has a different visual appearance than the second vein and the third vein.

5. The processed slab of claim 1, wherein the first particulate mineral mix is differently colored than the second particulate mineral mix.

6. The processed slab of claim 5, wherein the third vein is defined by a third particulate mineral mix, the first particulate mineral mix differently colored than the third particulate mineral mix.

7. The processed slab of claim 5, wherein the front major surface and the rear major surface each flat and perpendicular to the slab thickness.

8. The processed slab of claim 1, wherein the first vein thickness is equal and parallel to the slab thickness.

9. The processed slab of claim 1, wherein the second vein thickness is equal and parallel to the slab thickness.

10. The processed slab of claim 1, wherein the first vein is compressed in a first direction perpendicular to the slab thickness by the second particulate mineral mix of the second vein adjacent to the first vein, and the first vein is compressed in a second direction parallel to the slab thickness.

11. The processed slab of claim 10, wherein the first particulate mineral mix is separated from and forms a substantially unmixed layer with respect to the second particulate mineral mix.

12. The processed slab of claim 1, wherein the first vein has a minimum vein width on the front major face of the processed slab that is greater than the slab thickness.

13. The processed slab of claim 1, wherein the second vein has a maximum vein width on a front major face of the processed slab that is less than the slab thickness.

14. The processed slab of claim 12, wherein the first and second veins each include more than one bowed portion bowed in a first direction toward the first long edge of the major surface and away from an opposing long edge of the major surface.

15. A set of separately processed slabs formed from a plurality of particulate mineral mixes deposited into a mold, each respective slab of the set comprising:

a slab width that is at least 2 feet, a slab length that extends perpendicular to the slab width and that is at least 6 feet, and a slab thickness that extends perpendicular to the slab width and the slab length, the slab length greater than the slab width;

a set of slab veins exposed along both a front major surface of the slab and a rear major surface of the slab parallel with the front major surface of the slab, each of the slab veins arranged according to the same predefined sequence for each of the separately processed slabs, the front major surface and the rear major surface each flat and perpendicular to the slab thickness, the set of slab veins defined by a plurality of deposited layers of particulate mineral mixes and comprising at least first, second, and third veins:

the first vein defined by a first particulate mineral mix that extends across the slab length, the first vein having a first vein length that is greater than the slab width, the first vein bowed in a first direction toward a first long edge of the major surface and away from an opposing long edge of the major surface along at least a portion of the first vein length, the first particulate mineral mix including a quartz material, a pigment, and a binder, and;

the second vein defined by a second particulate mineral mix, the second particulate mineral mix different than the first particulate mineral mix and including a quartz material, a pigment, and a binder, the second vein extending across the entire slab length between opposing short edges of the major surface, the second vein having a second vein length that is greater than the slab width, the second vein bowed in the first direction toward the first long edge of the major surface and away from the opposing long edge of the major surface along at least a portion of the second vein length.

16. The set of separately processed slabs of claim 15, wherein each front major surface of each respective slab in the set has similarly positioned and colored pigmented veins.

17. The set of separately processed slabs of claim 16, wherein the front major surface of each respective slab in the set is polished.

18. The processed slab of claim 17, wherein the second and third veins are positioned on opposing sides of the first vein in each respective slab in the set.

19. The processed slab of claim 18, wherein the first vein has a different visual appearance than the second vein and the third vein.

20. The processed slab of claim 19, wherein the first particulate mineral mix is differently colored than the second particulate mineral mix.

* * * * *